US009112430B2

(12) United States Patent
Elpel

(10) Patent No.: US 9,112,430 B2
(45) Date of Patent: Aug. 18, 2015

(54) DIRECT CURRENT TO ALTERNATING CURRENT CONVERSION UTILIZING INTERMEDIATE PHASE MODULATION

(71) Applicant: Array Power Inc., Sunnyvale, CA (US)

(72) Inventor: Marc Elpel, Sunnyvale, CA (US)

(73) Assignee: Firelake Acquisition Corp., Palo Alto, CA (US)

( * ) Notice: Subject to any disclaimer, the term of this patent is extended or adjusted under 35 U.S.C. 154(b) by 372 days.

(21) Appl. No.: 13/667,817

(22) Filed: Nov. 2, 2012

(65) Prior Publication Data

US 2013/0113293 A1   May 9, 2013

Related U.S. Application Data

(60) Provisional application No. 61/555,112, filed on Nov. 3, 2011.

(51) Int. Cl.
   *H02M 7/537* (2006.01)
   *H02M 7/5395* (2006.01)
   *H02M 3/158* (2006.01)
   (Continued)

(52) U.S. Cl.
   CPC .......... *H02M 7/5395* (2013.01); *H02M 3/1584* (2013.01); *H02J 3/383* (2013.01); *H02M 2001/007* (2013.01); *Y02E 10/563* (2013.01); *Y10T 307/707* (2015.04)

(58) Field of Classification Search
   CPC ................. H02M 7/5395; H02M 3/1584
   USPC ................. 307/75, 82, 86; 363/16, 79, 97, 98
   See application file for complete search history.

(56) References Cited

U.S. PATENT DOCUMENTS

| 2,726,280 | A | 9/1951 | Demurjian |
| 4,354,725 | A | 10/1982 | Herbaugh et al. |
| 4,375,662 | A | 3/1983 | Baker |

(Continued)

FOREIGN PATENT DOCUMENTS

| DE | 102005036153 A1 | 12/2006 |
| EP | 1605512 A2 | 12/2005 |

(Continued)

OTHER PUBLICATIONS

International Preliminary Report on Patentabiliy issued in International Application No. PCT/US2012/021356, having a mailing date of Jul. 25, 2013.

(Continued)

*Primary Examiner* — Rexford Barnie
*Assistant Examiner* — Thai Tran
(74) *Attorney, Agent, or Firm* — The Marbury Law Group, PLLC

(57) ABSTRACT

The systems, methods, and devices of the various embodiments provide a power converter that modulates the voltage to follow the envelope of the phase output such that the current may pass through to the line. The systems, methods, and devices of the various embodiments may provide a two phase power converter that modulates the voltage to follow the envelope of the two phase output. The systems, methods, and devices of the various embodiments may provide a three phase power converter that modulates the intermediate voltage to follow the envelope of the three phase output such that the current may pass through to the line without requiring intermediate storage.

4 Claims, 23 Drawing Sheets

(51) Int. Cl.
*H02J 3/38* (2006.01)
*H02M 1/00* (2007.01)

(56) References Cited

U.S. PATENT DOCUMENTS

| | | | |
|---|---|---|---|
| 4,453,383 A | 6/1984 | Collins | |
| 4,649,334 A | 3/1987 | Nakajima | |
| 4,719,550 A | 1/1988 | Powell et al. | |
| 4,816,982 A | 3/1989 | Severinsky | |
| 4,868,379 A | 9/1989 | West | |
| 4,899,269 A | 2/1990 | Rouzies | |
| 5,001,406 A | 3/1991 | Peterson | |
| 5,017,860 A | 5/1991 | Germer et al. | |
| 5,276,706 A | 1/1994 | Critchlow | |
| 5,474,460 A | 12/1995 | Tirrell et al. | |
| 5,559,685 A | 9/1996 | Lauw et al. | |
| 5,621,300 A | 4/1997 | Sato et al. | |
| 5,642,275 A | 6/1997 | Peng et al. | |
| 5,654,883 A | 8/1997 | Takehara et al. | |
| 5,682,305 A | 10/1997 | Kurokami et al. | |
| 5,739,724 A | 4/1998 | Alexandre et al. | |
| 5,869,956 A | 2/1999 | Nagao et al. | |
| 5,892,354 A | 4/1999 | Nagao et al. | |
| 6,046,919 A | 4/2000 | Madenokouji et al. | |
| 6,111,767 A | 8/2000 | Handleman | |
| 6,111,770 A | 8/2000 | Peng | |
| 6,172,481 B1 | 1/2001 | Curtiss | |
| 6,204,627 B1 | 3/2001 | Watanabe et al. | |
| 6,219,623 B1 | 4/2001 | Wills | |
| 6,227,914 B1 | 5/2001 | Lee et al. | |
| 6,259,017 B1 | 7/2001 | Takehara et al. | |
| 6,324,085 B2 * | 11/2001 | Kimura et al. | 363/132 |
| 6,339,538 B1 | 1/2002 | Handleman | |
| 6,365,825 B1 | 4/2002 | Hayashi et al. | |
| 6,493,246 B2 | 12/2002 | Suzui et al. | |
| 6,545,211 B1 | 4/2003 | Mimura | |
| 6,639,413 B2 | 10/2003 | Whitehead et al. | |
| 6,690,590 B2 | 2/2004 | Stamenic et al. | |
| 6,750,391 B2 | 6/2004 | Bower et al. | |
| 6,810,339 B2 | 10/2004 | Wills | |
| 6,844,739 B2 | 1/2005 | Kasai et al. | |
| 6,892,165 B2 | 5/2005 | Yagi et al. | |
| 6,969,967 B2 | 11/2005 | Su | |
| 7,023,186 B2 | 4/2006 | Yan | |
| 7,042,195 B2 | 5/2006 | Tsunetsugu et al. | |
| 7,161,082 B2 | 1/2007 | Matsushita et al. | |
| 7,171,665 B1 | 1/2007 | Kobayashi et al. | |
| 7,191,656 B2 | 3/2007 | Yagi et al. | |
| 7,256,566 B2 | 8/2007 | Bhavaraju et al. | |
| 7,309,850 B2 | 12/2007 | Sinton et al. | |
| 7,354,306 B2 | 4/2008 | Thorner | |
| 7,372,236 B2 | 5/2008 | Kobayashi | |
| 7,406,800 B2 | 8/2008 | Cinnamon et al. | |
| 7,491,077 B1 | 2/2009 | Yang | |
| 7,550,952 B2 | 6/2009 | Kurokami et al. | |
| 7,553,182 B2 | 6/2009 | Buck et al. | |
| 7,572,133 B2 | 8/2009 | Hughes et al. | |
| 7,573,209 B2 | 8/2009 | Ashdown et al. | |
| 7,576,449 B2 | 8/2009 | Becker et al. | |
| 7,596,008 B2 | 9/2009 | Iwata et al. | |
| 7,602,156 B2 | 10/2009 | Weng et al. | |
| 7,616,467 B2 | 11/2009 | Mallwitz | |
| 7,719,140 B2 | 5/2010 | Ledenev et al. | |
| 7,719,864 B2 | 5/2010 | Kernahan et al. | |
| 7,796,412 B2 | 9/2010 | Fornage | |
| 7,843,085 B2 | 11/2010 | Ledenev et al. | |
| 7,884,500 B2 | 2/2011 | Kernahan | |
| 7,925,459 B2 | 4/2011 | Fornage | |
| 2002/0030365 A1 | 3/2002 | Underwood et al. | |
| 2002/0057751 A1 | 5/2002 | Jagger et al. | |
| 2002/0080631 A1 | 6/2002 | Kanouda et al. | |
| 2003/0053323 A1 * | 3/2003 | Kimura et al. | 363/98 |
| 2004/0097914 A1 | 5/2004 | Pantera et al. | |
| 2004/0169488 A1 | 9/2004 | Maeda et al. | |
| 2004/0174720 A1 * | 9/2004 | Kurokami et al. | 363/16 |
| 2004/0225225 A1 | 11/2004 | Naumov et al. | |
| 2005/0105224 A1 * | 5/2005 | Nishi | 361/18 |
| 2005/0128777 A1 * | 6/2005 | Yamanaka et al. | 363/98 |
| 2005/0135031 A1 * | 6/2005 | Colby et al. | 361/78 |
| 2005/0139259 A1 | 6/2005 | Steigerwald et al. | |
| 2005/0172995 A1 | 8/2005 | Rohrig et al. | |
| 2005/0284517 A1 | 12/2005 | Shinohara | |
| 2006/0152085 A1 * | 7/2006 | Flett et al. | 307/75 |
| 2006/0162772 A1 | 7/2006 | Presher, Jr. et al. | |
| 2006/0185727 A1 | 8/2006 | Matan | |
| 2006/0239389 A1 | 10/2006 | Coumou | |
| 2006/0262576 A1 | 11/2006 | Przybyla et al. | |
| 2007/0040825 A1 | 2/2007 | Mamba et al. | |
| 2007/0119718 A1 | 5/2007 | Gibson et al. | |
| 2007/0139137 A1 | 6/2007 | Muniraju et al. | |
| 2007/0273338 A1 | 11/2007 | West | |
| 2008/0078436 A1 | 4/2008 | Nachamkin et al. | |
| 2008/0088829 A1 | 4/2008 | Fuyuki | |
| 2008/0094019 A1 | 4/2008 | Steigerwald et al. | |
| 2008/0191666 A1 | 8/2008 | Kernahan et al. | |
| 2008/0238195 A1 | 10/2008 | Shaver et al. | |
| 2008/0284595 A1 | 11/2008 | Buchhalter | |
| 2008/0306700 A1 | 12/2008 | Kawam et al. | |
| 2009/0027933 A1 * | 1/2009 | Kajouke et al. | 363/97 |
| 2009/0032093 A1 | 2/2009 | Fang | |
| 2009/0066163 A1 * | 3/2009 | Gallegos-Lopez et al. | 307/86 |
| 2009/0160258 A1 | 6/2009 | Allen et al. | |
| 2009/0160259 A1 | 6/2009 | Naiknaware et al. | |
| 2009/0183760 A1 | 7/2009 | Meyer | |
| 2009/0290393 A1 | 11/2009 | Angerer et al. | |
| 2009/0310391 A1 | 12/2009 | Becker-Irvin et al. | |
| 2010/0071742 A1 * | 3/2010 | de Rooij et al. | 136/244 |
| 2010/0139752 A1 | 6/2010 | Fang | |
| 2010/0149847 A1 | 6/2010 | Kernahan | |
| 2010/0152917 A1 | 6/2010 | Kernahan | |
| 2010/0157632 A1 | 6/2010 | Batten et al. | |
| 2010/0157638 A1 | 6/2010 | Naiknaware et al. | |
| 2010/0164288 A1 | 7/2010 | Kernahan et al. | |
| 2010/0236612 A1 | 9/2010 | Khajehoddin et al. | |
| 2010/0283325 A1 | 11/2010 | Marcianesi et al. | |
| 2011/0055303 A1 | 3/2011 | Slavin | |
| 2011/0055445 A1 | 3/2011 | Gee et al. | |
| 2011/0057516 A1 | 3/2011 | Spanoche et al. | |
| 2011/0149610 A1 | 6/2011 | Moussaoui et al. | |
| 2011/0160930 A1 | 6/2011 | Batten et al. | |
| 2011/0182093 A1 * | 7/2011 | Brogan et al. | 363/79 |
| 2011/0216512 A1 | 9/2011 | Vosper et al. | |
| 2011/0282502 A1 | 11/2011 | Fife et al. | |
| 2011/0291480 A1 | 12/2011 | Nair et al. | |
| 2012/0268087 A1 | 10/2012 | Kernahan | |

FOREIGN PATENT DOCUMENTS

| | | |
|---|---|---|
| JP | 11318042 A | 11/1999 |
| JP | 2000174308 A | 6/2000 |
| JP | 2001320884 A | 11/2001 |
| WO | 2006089794 A1 | 8/2006 |
| WO | 2007124059 A2 | 11/2007 |
| WO | 2011104253 A2 | 9/2011 |

OTHER PUBLICATIONS

Office Action dated Dec. 23, 2012 of Israeli Patent Application No. 212995.

International Preliminary Report of Patentability issued in PCT Application No. PCT/US2012/063420, mailed on May 15, 2014.

International Search Report and Written Opinion issued in PCT Application No. PCT/US2012/063420, mailed on Mar. 15, 2013.

Kjaer, "Design and Control of an Inverter for Photovoltaic Applications", Aalborg University, Denmark, Institute of Energy Technology, Jan. 2005.

Dung Duc Nguyen, "Modeling and reconfiguration of solar photovoltaic arrays under non-uniform shadow conditions", Iris Northeastern University, Jan. 2008.

"Introduction to Strain and Strain Gages", DOC-AN00007-00, Rev B, Jul. 11, 2007, Madge Tech, Inc, 201 Route 103 West, Warner, NH 03278.

(56) References Cited

OTHER PUBLICATIONS

Ashok Rangaswamy, "Effect of CdCl2 Treatment on CdTe and CdS Solar Cell Characteristics after Exposure to Light for 1000 Hours", University of South Florida, Jul. 11, 2003.

Bruendlinger et al., "Maximum Power Point Tracking Performance Under Partially Shaded PV Array Conditions", Technical University Berlin, Einsteinufer, 2006.

C. Liu et al., "Advanced Algorithm for MPPT Control of Photovoltaic Systems," Dept. of Electrical & Computer Engineering, Ryerson University; Canadian Solar Buildings Conference, Aug. 20-24, 2004, Montreal, Canada.

C.A.G. Castaneda, "Maximum Power Point Tracking Using Modified P&O Method for the Off Grid Radar," Master of Science in Electrical Engineering Thesis, University of Puerto Rico Mayaguez; 92pgs, 2008.

Chao et al., "An Intelligent Maximum Power Point Tracking Method Based on Extension Theory for PV Systems," Expert Systems with Applications, Copyright 2009 Elsevier Ltd.

D. Morgan, "An Investigation Into Degradation of CdTe Solar Cells", Colorado School of Mines, Golden Colorado,1998.

Faranda et al., "Energy Comparison of MPPT Techniques for PV Systems," WSEAS Transactions on Power Systems, Issue 6, vol. 3, Jun. 2005.

G.M.S. Azavedo et al., "Comparative Evaluation of Maximum Power Point Tracking Methods for Photovoltaic Systems," Journal of Solar Energy Engineering, Aug. 2009, vol. 131.

Herrmann et al., "Hot Spot Investigation on PV Modules—New Concepts for a Test Standard and Consequences for Module Design with Respect to Bypass Diodes", Cologne, Germany.

Houghton et al, "Pulse Analysis of Acoustic Emission Signals", NASA Contractor Report 2927; USA, Dec. 1977.

Int. Search Report issued in PCT Application PCT/US2010/047935, mailed Jul. 12, 2011.

International Search Report & Written Opinion Issued in PCT Application No. PCT/US2012/021356, mailed on Aug. 9, 2012.

International Search Report issued in PCT/US2010/035893, mailed on Dec. 1, 2010.

Kammel et al, "A Simple Glass Breakage Detector Using the MSP430", Texas Instruments, SLAA351, Apr. 2007.

Karatepe et al., "Voltage based power compensation system for photovoltaic generation system under partially shaded insolation conditions", Science Direct, Mar. 2003.

Kolakowski et al., "Two Approaches to Structural Damage Identification: Model Updating versus Soft Computing", Journal of Intelligent Material Systems and Structures, vol. 17, Jan. 2006, USA.

Lorenzo et al., "An Investigation into Hot-Spots in Two Large Grid-Connected PV Plants", progress in Photovoltaics: Research and Applications, Apr. 2008.

N. Moubayed et al., "A Comparison of Two MPPT Techniques for PV System," WSEAS Transactions on Environment & Development, Issue 12, vol. 5, Dec. 2009.

Park et al., "A Study on the Optimal Voltage for MPPT obtained by Surface Temperature of Solar Cell", The 30th Annual Conference of the IEEE, Nov. 2-6, 2004.

Rooij et al., "Advanced Reliability Improvement of Ac-Modules", Netherlands Energy Research Foundation ECN, Published Report, 1997-2000.

Sera et al., "Real-time Modelling, Diagnostics and Optimised MPPT for Residential PV systems", Aalborg University, Institute of Energy Technology, Denmark, Jan. 2009.

Stultz et al, "Fundamentals of Resonant Acoustic Modethod NOT", The Model Shop, Inc., 3149 East Kemper Road, Cincinnati, OH 45241.

Supplementary European Search Report issued in European Patent Application No. 09836818.6, mailed on Jun. 6, 2012.

T. Zhou, "Fabrication of Stable, Large-Area Thin-Film CdTe Photovoltaic Modules, Final Subcontract Report", National Renewable Energy Laboratory, 1617 Cole Blvd., Golden, CO, 80401, Jun. 1995.

Woyte et al., "Partial shadowing of photovoltaic arrays with different system configurations: literature review and field test results", Science Direct, Apr. 2003.

Zhai et al, "Detection of Crack Closure in Time-Resolved Acoustic Microscopy", IEEE 1051-0117/94/0000-1421, 1994.

\* cited by examiner

DIRECT CURRENT TO ALTERNATING CURRENT CONVERSION UTILIZING INTERMEDIATE PHASE MODULATION

RELATED APPLICATIONS

This application claims the benefit of priority to U.S. Provisional Patent Application 61/555,112 entitled "Direct Current to Alternating Current Conversion Utilizing Intermediate Phase Modulation" filed Nov. 3, 2011, the entire contents of which are incorporated herein by reference.

FIELD

The present invention relates generally to direct current to alternating current conversion and more particularly to methods and systems for two and three phase power conversion.

BACKGROUND

Concerns for global warming caused by human activity, the increasing cost and potential eventual lack of availability of oil and natural gas, even the shortage of water for hydroelectric power, have resulted in interest in cost-effective methods and materials for providing energy. Renewable energy sources, especially electricity generated by photovoltaic panels, have been of keen interest. At the present time the widespread use and installation of photovoltaic or solar panels and other solar equipment is hampered by many factors, including poor efficiency, short product life, and significant cost.

Photovoltaic panels may be expected by their makers to last at least twenty five years. However, the inverters used in today's installations require very large, high capacitance electrolytic capacitors. Existing photovoltaic panel inverter topologies use capacitance to convert photovoltaic panel diode arrays from current sources to voltage sources and for moving energy from valleys to peaks in the alternating current ("AC") waveform. The capacitance density of existing photovoltaic panel inverter topologies requires electrolytic capacitors. Practical electrolytic capacitors are fundamentally not suitable for long life applications at high temperatures. The electrolytic capacitors in photovoltaic panels may be subjected to large temperature extremes, such as the high temperatures experienced on a building roof. These temperature extremes may shorten the effective life of the electrolytic capacitors. Additionally, the liquid in the electrolytic capacitors will eventually leak out of the canisters. Both of these short comings of electrolytic capacitors may cause the electrolytic capacitors or the entire photovoltaic panel to be replaced in as little as five years after installation. This leads to an increased lifetime total cost of ownership for a photovoltaic panel system.

Conventional Boost-Buck inverter systems used with photovoltaic panels may require substantial capacitance at the intermediate node to hold a high direct current ("DC") voltage for the inverter to then step down to create a lower AC voltage output. A typical inverter system may consist of a boost stage, which creates a high intermediate voltage, then a buck stage that may convert that voltage back down to a regulated output. As an example, a conventional Boost-Buck inverter may boost a 30V DC voltage input from a photovoltaic panel to a 400V DC voltage, which may in turn be stepped down to create a 208V AC voltage output. The voltage boost in the example Boost-Buck inverter may require a large capacitance, such as 100-1000 microfarad (100 μF-1000 μF). This large capacitance is typically electrolytic and may present the problems discussed above in relation to electrolytic capacitors. Also, stepping the voltage up to a fixed high voltage DC bus, which may typically be higher than an output (i.e., line) peak voltage, may result in additional losses in the boost stage. Additionally, conventional inverter systems may require high speed switching of all of the phase outputs to convert the DC input to a two or three phase AC output. This switching of all the phase outputs may result in switching losses at the output.

SUMMARY

The systems, methods, and devices of the various embodiments provide a power converter that modulates the voltage to follow the envelope of the phase output such that the current may pass through to the line. The systems, methods, and devices of the various embodiments may provide a two phase power converter that modulates the voltage to follow the envelope of the two phase output. The systems, methods, and devices of the various embodiments may provide a three phase power converter that modulates the intermediate voltage to follow the envelope of the three phase output such that the current may pass through to the line without requiring intermediate storage. This current pass through may provide a three phase power converter at reduced cost, with reduced capacitance, lower boost losses, lower switching loss, and a smaller total part count. Modulating the intermediate voltage may allow for switching of only one of the output phases resulting in less switching loss.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
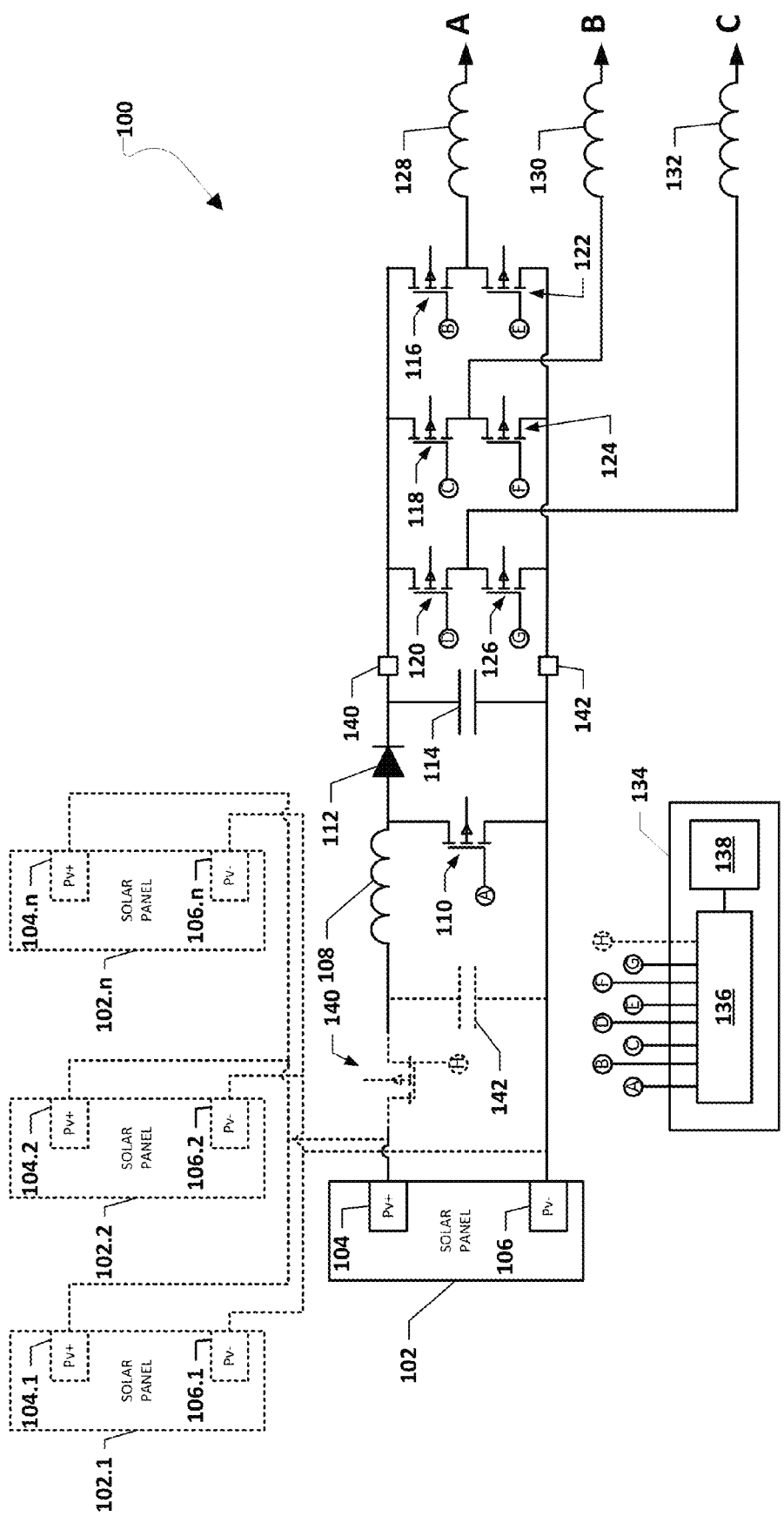
FIG. 1 is a circuit diagram of a power generation system according to a first embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various embodiments are described herein using the example of a photovoltaic or solar panel as a DC input. This example is useful for describing the various components and functionality of the embodiment devices, systems and methods. However, the embodiments and the scope of the claims are not limited to such a configuration unless specifically recited. Describing the embodiments in terms of other potential applications would be unnecessary and repetitive. Thus, the terms "solar panel" or "photovoltaic panel" are used herein to refer generally to any form DC input, which the embodiments could be applied, and is not intended to limit the scope of the claims unless specifically recited.

Two phase power can be broken into an envelope consisting of maximum and minimum signals. At any point in time, one of the phases of the two phase power system may be at the maximum envelope and one may be at the minimum envelope.

Three phase power can be broken into an envelope consisting of the maximum and minimum signals, and an intermediate signal transitioning between the outer envelope pairs. At any point in time, one of the phases of three phase power may be at the maximum envelope, one may be at the minimum envelope, and one may be an intermediate phase transitioning between the maximum and minimum envelope.

In overview, the systems, methods, and devices of the various embodiments provide a three phase power converter that modulates the intermediate voltage to follow the envelope of the three phase output such that the current may pass through to the line without requiring intermediate storage. This current pass through may provide a three phase power converter with reduced cost, capacitance, switching loss, and total part count. Modulating only the intermediate voltage may allow only one of the output phases to be switched resulting in less switching loss.

In overview, the systems, methods, and devices of the various embodiments may provide a two phase power converter that modulates the voltage to follow the envelope of the two phase output.

The various embodiments may provide a control algorithm that injects steady power into a modulated intermediate envelope. The control algorithm may allow the intermediate stage to then float through directly connected to the line. By modulating the intermediate stage voltage, only one of the output phases may need to be pulse width modulated. This may result in one third the nominal switching loss when compared to an inverter that must modulated all three output phases at the same time. Additionally, modulation of the intermediate stage may allow for power pass through, which may not require any significant energy storage at the intermediate stage. The lack of a requirement for any significant energy storage at the intermediate stage may eliminate the need for electrolytic capacitors in the power generation system.

The various embodiments may provide a control algorithm that modulates the high side switching in a two phase power generation system such that a voltage at a boost capacitor remains above the two phase line voltage.

The various embodiments provide a power generation system in which a DC power source, such as a solar panel may be used to generate AC power, such as three phase AC power and/or two phase AC power. In the various embodiments the non-isolated power generation input may be coupled to the lower rail of a power output envelope, thereby "floating" the power generation system to the negative rail. Floating the power generation system to the negative rail may allow a single switch, such as a single metal-oxide-semiconductor field-effect transistor (MOSFET), to be used rather than back to back parts required in other application where the voltage is bipolar relative to a switching circuit. Additionally, floating the power generation system to the negative rail may simplify the overall isolation scheme for a power converter.

The various embodiments provide a power generation system in which a plurality of DC power sources may be locally controlled to create modulated DC outputs, and the DC outputs may be inverted to AC power at a centralized location. A combiner box may convert the modulated DC outputs to a single AC output, which may allow sharing of output components across multiple DC inputs. The single AC output may be any phase AC output, such as single phase AC, two phase AC, or three phase AC.

FIG. 1 illustrates an embodiment power generation system 100 that may operate as a direct inversion power modulator to convert a DC input to a three phase AC output. A direct electrical current source, such as solar panel 102 may provide the DC input to the power generation system 100. While a solar panel 102 is depicted in FIG. 1, the embodiments are not limited to a solar panel 102, and any DC power source may be implemented in the device. The solar panel 102 may have a positive electrical output terminal 104 and a negative electrical output terminal 106. The positive electrical output terminal 104 of the solar panel 102 may be connected to an input terminal of a coil 108. As an example, the coil 108 may be a 0.5-2.0 millihenry (0.5-2.0 mH) inductor, and the maximum current for the coil 108 may be 5-10 amperes (5-10 A). An output terminal of the coil 108 may be coupled to an input terminal of a boost switch 110. As an example, the boost switch 110 may be a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. An output terminal of the boost switch 110 may be connected to the negative electrical output terminal 106 of the solar panel 102. A controller 134, discussed further below, may have an output terminal that provides a control signal to a control gate of the boost switch 110 via control line A.

An input terminal of a diode 112 may be connected to the output terminal of the coil 108. While a diode 112 is depicted in FIG. 1, the embodiments are not limited to a diode 112 and the current control functionality may be implemented as a switch, such as a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. The implementation of diode 112 as a switch may provide efficient synchronous switching of the boost stage. An input terminal of a capacitor 114 may be connected to an output terminal of the diode 104 and an output terminal of the capacitor 114 may be connected to the negative electrical output terminal 106 of the solar panel 102. As an example, the capacitor 114 may be a 1 microfarad (1 µF) capacitor. An input terminal 140 may be connected to the output terminal of the diode 112 and the input terminal of the capacitor 114. An input terminal 142 may be connected to the output terminal of the capacitor 114. Input terminals of switches 116, 118, and 120 may be connected in parallel with the input terminal 140. Input terminals of switches 122, 124, and 126 may be connected in parallel with the input terminal 142. As an example, switches 116, 118, 120, 122, 124, and 126 may be single MOSFETs, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. Switches 116, 118, 120, 122, 124, and 126 may be controlled via control signals from the controller 134 sent via control lines B, C, D, E, F, and G, respectively.

An output terminal of switch 116 and an output terminal of switch 122 may be connected together to form a single output terminal. Connected together in this manner, switch 116 and 122 may form a half bridge circuit. The output terminal of switch 116 and output terminal of switch 122 may be connected together to form a single output terminal that may be connected to an input terminal of coil 128. As an example, coil 128 may be an inductor, configured to output current to line A. As an example, coil 128 may be a 1 mH inductor. As an example, line A may be a single line connection to a three phase power grid.

An output terminal of switch 118 and an output terminal of switch 124 may be connected together to form a single output terminal. Connected together in this manner, switch 118 and 124 may form a half bridge circuit. The output terminal of switch 118 and output terminal of switch 124 may be connected together to form a single output terminal that may be connected to an input terminal of coil 130. As an example, coil 130 may be an inductor, configured to output current to line B. As an example, coil 130 may be a 1 mH inductor. As an example, line B may be a single line connection to a three phase power grid.

An output terminal of switch 120 and an output terminal of switch 126 may be connected together to form a single output terminal. Connected together in this manner, switch 120 and 126 may form a half bridge circuit. The output terminal of switch 120 and output terminal of switch 126 may be connected together to form a single output terminal that may be connected to an input terminal of coil 132. As an example, coil 132 may be an inductor, configured to output current to line C. As an example, coil 132 may be a 1 mH inductor. As an example, line C may be a single line connection to a three phase power grid.

A benefit of the half bridge circuit configuration discussed above in relation to switches 116, 118, 120, 122, 124, and 126 may be that the power generation system 100 may be protected against line to line mistiming events. If during the transition two switches comprising a half bridge circuit are open simultaneously, the coil on that line (i.e., 128, 130, or 132) may pull current through the diode 112 ensuring a safe operating limit is maintained for the power generation system 100. Line to line shoot through may not be a concern because the voltage in the system 100 may only be a function of the single capacitor 114, and having two output lines (e.g., A and B, A and C, or B and C) connected simultaneous may be a normal operating condition.

In an alternative optional embodiment, a panel disconnect switch 140 may be connected between the positive electrical output terminal 104 of the solar panel 102 and the input terminal of coil 108. The panel disconnect switch 140 may be a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. The controller 134, discussed further below, may have an output terminal that provides a control signal to a control gate of the panel disconnect switch 110 via control line H. An input terminal of a panel input capacitor 142 may be connected to the output terminal of the panel disconnect switch 140 and an output terminal of capacitor 142 may be connected to the negative electrical output terminal 106 of the solar panel 102. When opened, the panel disconnect switch 140 may allow the solar panel 102 to be electrically disconnected from the rest of the power generation system 100. In another alternative embodiment (not shown), the panel disconnect switch 140 may be connected between the output terminal of the capacitor 142 and the negative electrical output terminal 106 of the solar panel 102.

In another alternative optional embodiment a plurality of solar panels 102.1, 102.2, and 102.n may be connected in parallel with solar panel 102. While FIG. 1 depicts an optional embodiment with four solar panels 102, 102.1, 102.2, and 102.n, any number of solar panels, such as 1, 2, 3, 4, or greater, may be implemented in power generation system 100. The solar panels 102.1, 102.2, and 102.n may each have a positive electrical output terminal 104.1, 104.2, and 104.n, respectively, and a negative electrical output terminal 106.1, 106.2, and 106.n, respectively. All the positive electrical output terminals 104, 104.1, 104.2, and 104.n may be connected together in parallel and connected to the input terminal of coil 108 as discussed above. All the negative electrical output terminals 106, 106.1, 106.2, and 106.n may be connected together in parallel and connected to the output terminals of boost switch 110, capacitor 114, and input terminal 142. In another optional alternative embodiment (not shown), solar panels 102, 102.1, 102.2, and 102.n may be connected in series.

The controller 134 may comprise a plurality of output terminals, each of which may be operated independently. Control lines A, B, C, D, E, F, G, and H may be connected to the control gates of switches 110, 116, 118, 120, 122, 124, 126, and 140, respectively. Controller 134 may contain a programmable controller or processor 136 and a memory 138. The programmable controller 136 may allow the controller 134 to perform logic operations and to control the operation of switches 110, 116, 118, 120, 122, 124, 126, and 140 in response to information stored in the memory 138. The control lines A, B, C, D, E, F, G, and H may be coupled to the programmable controller 136 such that control signals from the programmable controller 136 may be sent via the control lines A, B, C, D, E, F, G, and H to the switches 110, 116, 118, 120, 122, 124, 126, and 140.

The programmable controller 136 may receive inputs from monitoring devices (not shown) placed throughout the power generation system 100 to provide input of operating conditions of the power generation system 100. As an example, operating condition inputs may include the voltage or current at any point in the power generation system 100 (e.g., output current sensors for each output line, A, B, and C and/or a current sensor connected to coil 108) or the shape of the line waveform on the three output lines A, B, and C. Additionally, the memory 138 may store known operating conditions, such as an ideal line waveform. The monitored operating conditions and/or the known operating conditions stored in the memory 138 may be used by the programmable controller 136 to control the operation of the power generation system 100. As an example, to maintain a constant power output in the power generation system 100, an ideal line waveform stored in the memory 138 may be referenced by the programmable controller 136 to control the operation of boost switch 110. The ideal line waveform may be fed forward into a control algorithm for the boost switch 110, which may enable the programmable controller 136 to create a modulated DC output to maintain a constant power output by controlling the operation of the boost switch 110. As an alternative example, the three phase power grid line waveform may be tracked in real time and provided to the programmable controller 136. This tracked waveform may be used as a feed forward input to a control algorithm for the boost switch 110, which may enable the programmable controller 136 to create a modulated DC output to maintain a constant power output by controlling the operation of the boost switch 110. As another example, the current may be monitored in real time by an output current sensor and/or current sensor connected to coil 108 and provided to the programmable controller 136. The current data may enable the programmable controller 136 to balance the output phase currents by controlling the operation of the boost switch 110, switch 116, switch 118, switch 120, switch 122, switch 124, and/or switch 126.

In operation the power generation system 100 illustrated in FIG. 1 may begin by boosting the solar panel 102 voltage. When exposed to light the solar panel 102 may generate current. The boost switch 110 may be opened and closed by the controller 134 via a control signal on control line A to build current in the coil 108. In this manner, the solar panel 102 voltage may be boosted to the envelope of the three phase waveform, but need not be boosted above the line voltage. The solar panel 102 voltage input may be allowed to float with the solar panel 102 tied to the minimum phase input, i.e., the negative rail. In this manner, the absolute solar panel 102 voltage may float up and down following the lower envelope shape of the three phase waveform.

As the boost switch 110 is opened and closed a single output pulse may be sent through the diode 112 and across the capacitor 114 to the input terminals 140 and 142. The output pulse may be a pulse width modulated pulse that may be translated into a pulse amplitude modulated (PAM) current pulse. The voltage at the capacitor 114 may track the magnitude of the maximum and minimum three phase power envelopes and the voltage at the capacitor 114 may vary over time. The current and power transferred to the lines A, B, and C may be controlled by the operation of switches 116, 118, 120, 122, 124, and 126. The controller 134 may open and close switches 116, 118, 120, 122, 124, and 126 via control signals on control lines B, C, D, E, F, and G, respectively, to control the flow of current to lines A, B, and C. As an example, in an initial state, the controller may close switches 116 and 126, and open switches 118, 120, 122, and 124. In this manner, positive current pulses may be provided to line A and the negative current pulses to line C. In this initial state, line A may represent the maximum three phase power envelope and line C may represent the minimum three phase power envelope. In this initial state, line B may represent the transitioning phase. As an example, if the transitioning phase is increasing, switches 118 and 124 for line B may be opened and closed in response to control signals sent from the controller 134 via control lines C and F to create an output current proportional to the voltages between the high and low phases represented on lines A and C, respectively. The current and power transferred to lines A and C may be a direct function of the power transferred to the capacitor 114 minus the power taken by line B that is transitioning within the three phase voltage envelope.

Figure 2:
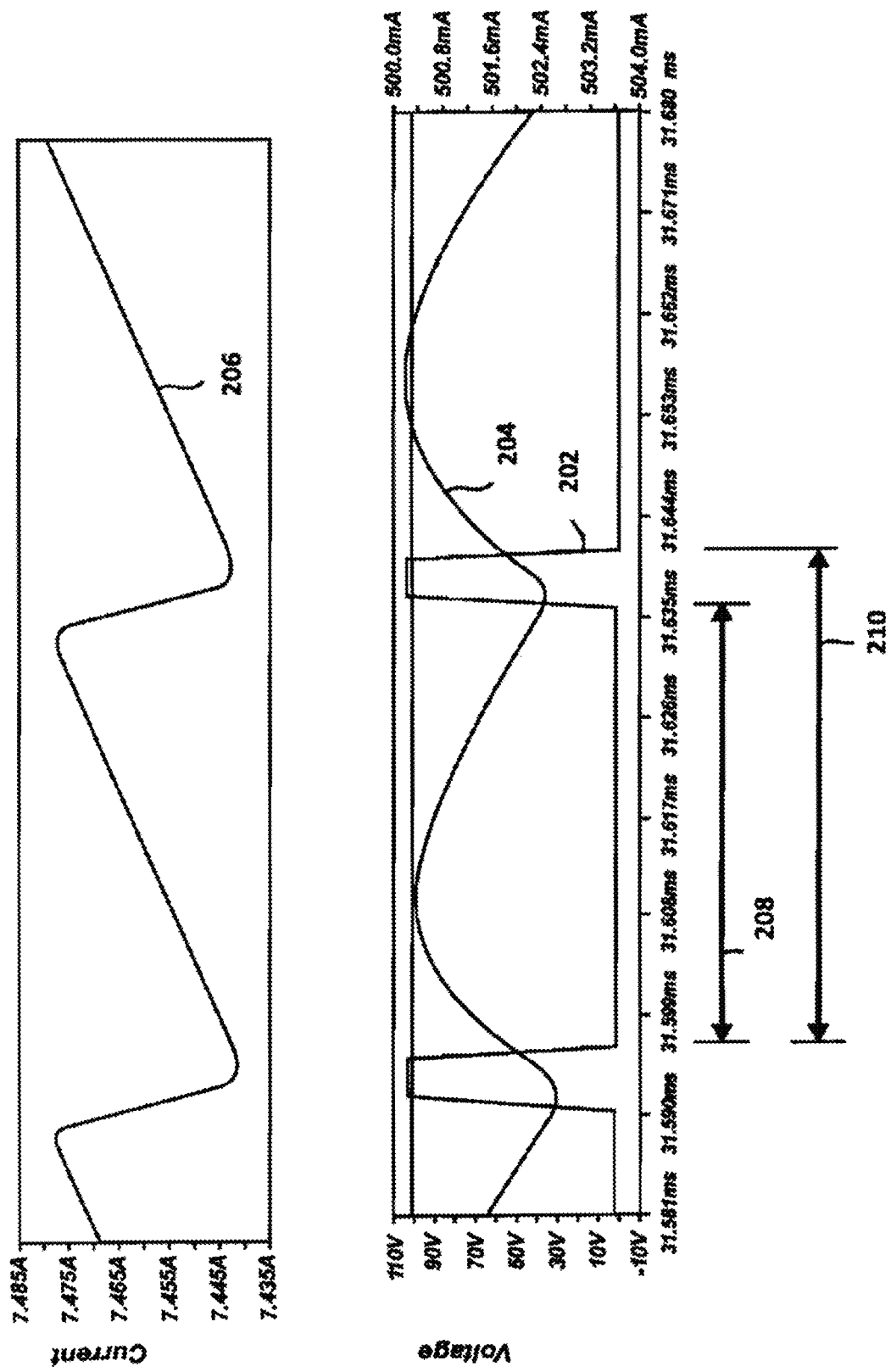
FIG. 2 is a graph relating time, voltage, current, and switching periods.

FIG. 2 illustrates an example of the result of the conversion of a pulse width modulated pulse that may be translated into a pulse amplitude modulated (PAM) current pulse by the power generation system 100. The short duration roughly rectangular voltage pulses 202 may represent the voltage on the drain side of boost switch 110. The pulse width 208 may approximate the pulse width of the signal from the controller 134 via line A and the period 210 may be the switching period of the power generation system 100. The rounded half wave rectified sine wave 204 may be the output of the power generation system 100 to any of the three lines, A, B, C, depending on the status of the control signals from controller 134 and the status of the switches 116, 118, 120, 122, 124, and 126. The capacitor 114 may act with the coils 128, 130, and 132 as reconstruction filters to create the rounded half wave rectified sine wave 204. The triangle waveform 206 illustrates the variation of the current through the solar panel 102 during the same time period, and shows the effect the coil 108 and input capacitor 142 may have in maintaining a relatively constant solar panel 102 current, independent of the relatively large pulse width modulated current pulses created by the reconstruction filters.

Figure 3A:
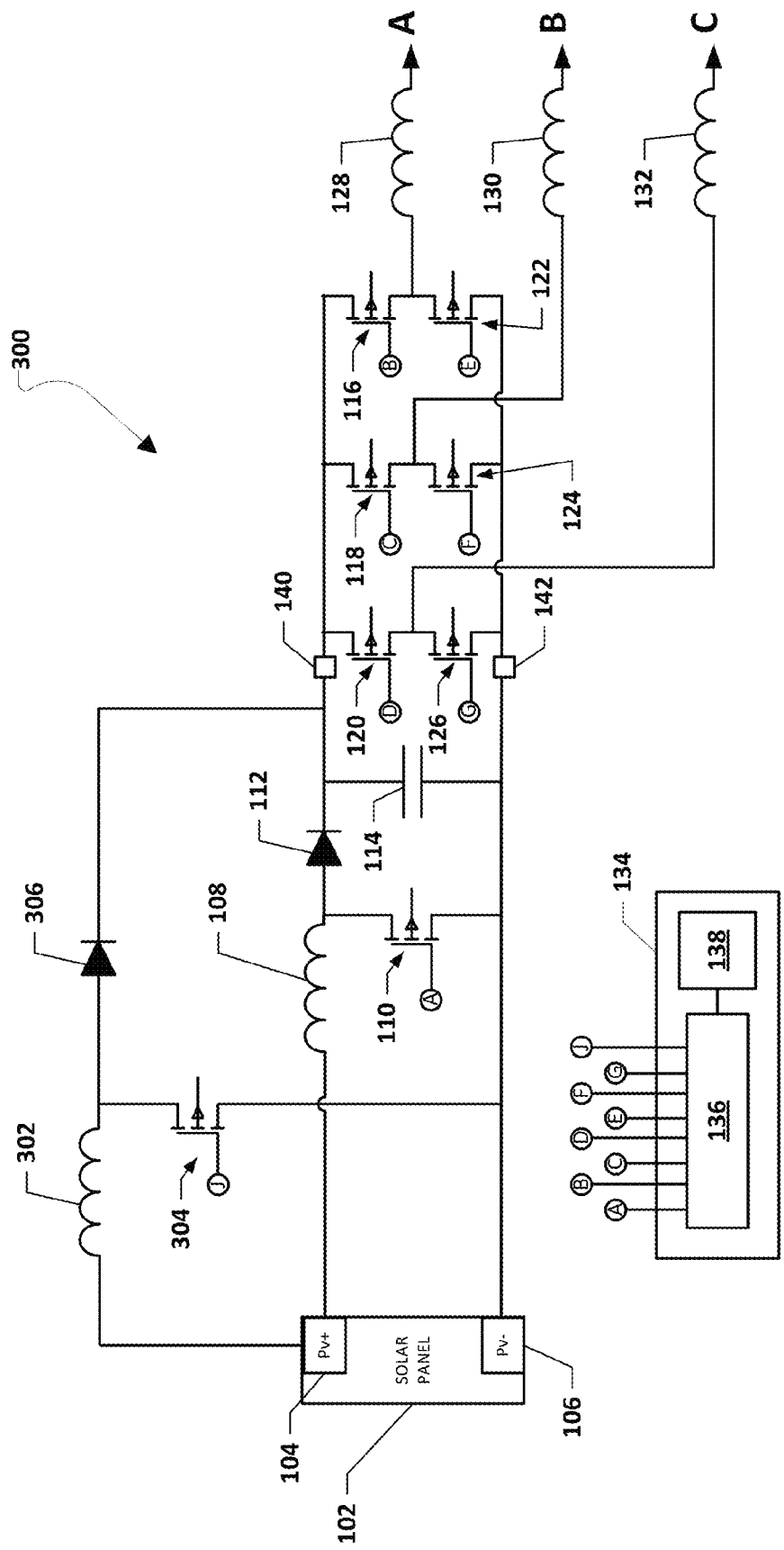
FIG. 3A is a circuit diagram of a power generation system according to a second embodiment.

FIG. 3A illustrates an embodiment of a power generation system 300 that is similar to power generation system 100 illustrated in FIG. 1 with the addition of a second coil 302, a second boost switch 304, and a second diode 306. The addition of a second coil 302 run in parallel with the first coil 108 may enable the coils 108 and 302 to operate independently. In this manner, one or both coils (108 and 302) may be used to transfer power.

In the embodiment illustrated in FIG. 3A, an input terminal of the second coil 302 may be connected to the positive output terminal 104 of the solar panel 102. As an example, the second coil 302 may be a 1 millihenry (1 mH) inductor, and the maximum current for the coil 302 may be 2.5 amperes (2.5 A). An output terminal of the second coil 302 may be coupled to an input terminal of the second boost switch 304. As an example, the second boost switch 304 may be a single MOSFET, though any known type of technology capable of performing a switching function, including relays, transistors, bi-polar transistors, insulated-gate bipolar transistors (IG- BTs), silicon carbide relays, nitride transistors, thyristors, series connected MOSFETs, thyristor emulators, and diodes in series with IGBTs may be used. An output terminal of the second boost switch 304 may be connected to the negative electrical output terminal 106 of the solar panel 102. The controller 134 may have an output terminal that provides a control signal to a control gate of the second boost switch 304 via control line J. The controller 134 may control the second boost switch 304 in a manner similar to that discussed above regarding the control of the boost switch 110. An input terminal of the second diode 306 may be connected to the output terminal of the second coil 302. While a second diode 306 is depicted in FIG. 3A, the embodiments are not limited to a second diode 306 and the current control functionality may be implemented as a switch, such as a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. The implementation of the second diode 306 as a switch may provide efficient synchronous switching of the boost stage. An output terminal of the second diode 306 may be connected to the input terminal of the capacitor 114.

In operation, the power generation system 300 operates in a similar manner as power generation system 100 described above with reference to FIG. 1. The addition of second coil 302 and second boost switch 304 may enable the coils (108 and 302) to transfer power independently. In low power applications only one of the coils (108 or 302) may be needed. For higher power applications, both coils (108 and 302) may be utilized by controlling the operation of both boost switches (110 and 304). Additionally, because the input in power generation system 300 may be fully isolated from the output of power generation system 300, the frequency of the input switching may be changed with minimal impact on the output waveform of the power generation system 300. The controller 134 may control the operation of the boost switches (110 and 304) independently based on a desired power output. As an example, for a power output of 0-25 watts (0-25 W) the controller 134 may only operate boost switch 110 at a switching frequency of 7.5 kilohertz (7.5 kHz). As an example, for a power output of 25-60 W the controller 134 may only operate boost switch 110 at a switching frequency of 15 kHz. As an example, for a power output of 60-150 W the controller 134 may operate boost switch 110 and boost switch 302, both at a switching frequency of 15 kHz. As an example, for a power output of 150 W-270 W the controller 134 may operate boost switch 110 and boost switch 302, both at a switching frequency of 30 kHz. As described above with reference to FIG. 1, the design of power generation system 300 may allow the absolute solar panel 102 voltage to float up and down following the lower envelope of the minimum phase input.

Figure 3B:
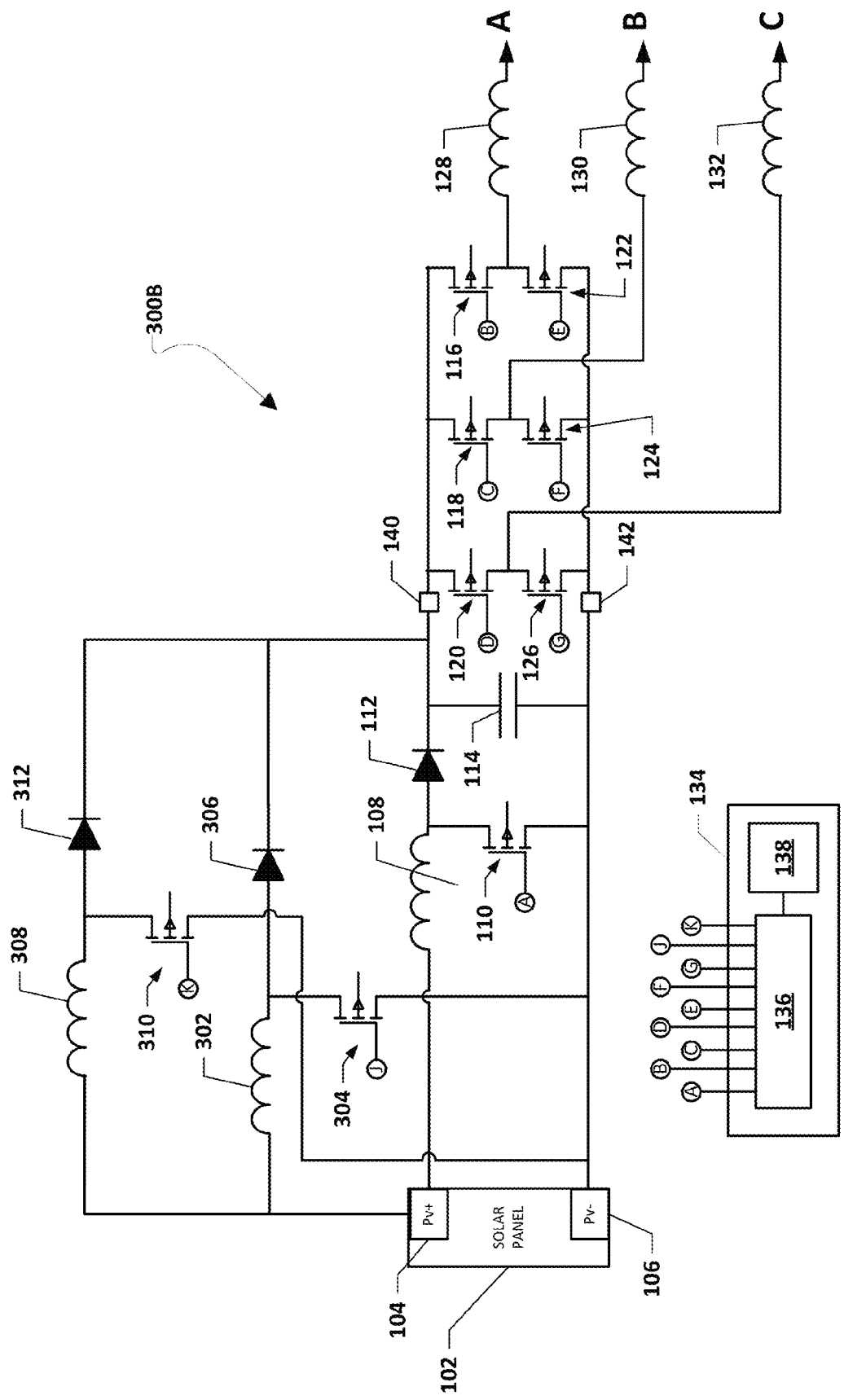
FIG. 3B is a circuit diagram of a power generation system according to a third embodiment.

FIG. 3B illustrates an embodiment of a power generation system 300B that is similar to power generation system 300 illustrated in FIG. 3A with the addition of a third coil 308, a third boost switch 310, and a third diode 312. The addition of a third coil 308 run in parallel with the first coil 108 and the second coil 302 may enable the coils 108, 302, and 308 to operate independently. In this manner, one, two, or three coils (108, 302, and 308) may be used to transfer power.

In the embodiment illustrated in FIG. 3B, an input terminal of the third coil 308 may be connected to the positive output terminal 104 of the solar panel 102. As an example, the third coil 308 may be a 1 millihenry (1 mH) inductor, and the maximum current for the coil 302 may be 1.66 amperes (1.66 A). An output terminal of the third coil 308 may be coupled to an input terminal of the third boost switch 310. As an example, the third boost switch 310 may be a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. An output terminal of the third boost switch 310 may be connected to the negative electrical output terminal 106 of the solar panel 102. The controller 134 may have an output terminal that provides a control signal to a control gate of the third boost switch 310 via control line K. The controller 134 may control the third boost switch 310 in a manner similar to that discussed above regarding the control of the boost switches 110 and 304. An input terminal of the third diode 312 may be connected to the output terminal of the third coil 308. While a third diode 312 is depicted in FIG. 3B, the embodiments are not limited to a third diode 312 and the current control functionality may be implemented as a switch, such as a single MOSFET, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. The implementation of the third diode 312 as a switch may provide efficient synchronous switching of the boost stage. An output terminal of the third diode 312 may be connected to the input terminal of the capacitor 114.

In operation, the power generation system 300B operates in a similar manner as the power generation system 300 described above with reference to FIG. 3. The addition of the third coil 308 and third boost switch 310 may enable the coils (108, 302, and 308) to transfer power independently. In low power applications only one of the coils (108, 302, or 308) may be needed. For higher power applications, two or three coils (108, 302, and/or 308) may be utilized by controlling the operation of two or three boost switches (110, 304, and/or 310). Additionally, because the input in power generation system 300B may be fully isolated from the output of power generation system 300B, the frequency of the input switching may be changed with minimal impact on the output waveform of the power generation system 300B. The controller 134 may control the operation of the boost switches (110, 304, and 310) independently based on a desired power output in a manner similar to that discussed above with reference to FIG. 3A. As described above with reference to FIG. 1, the design of power generation system 300B may allow the absolute solar panel 102 voltage to float up and down following the lower envelope of the minimum phase input.

Figure 4:
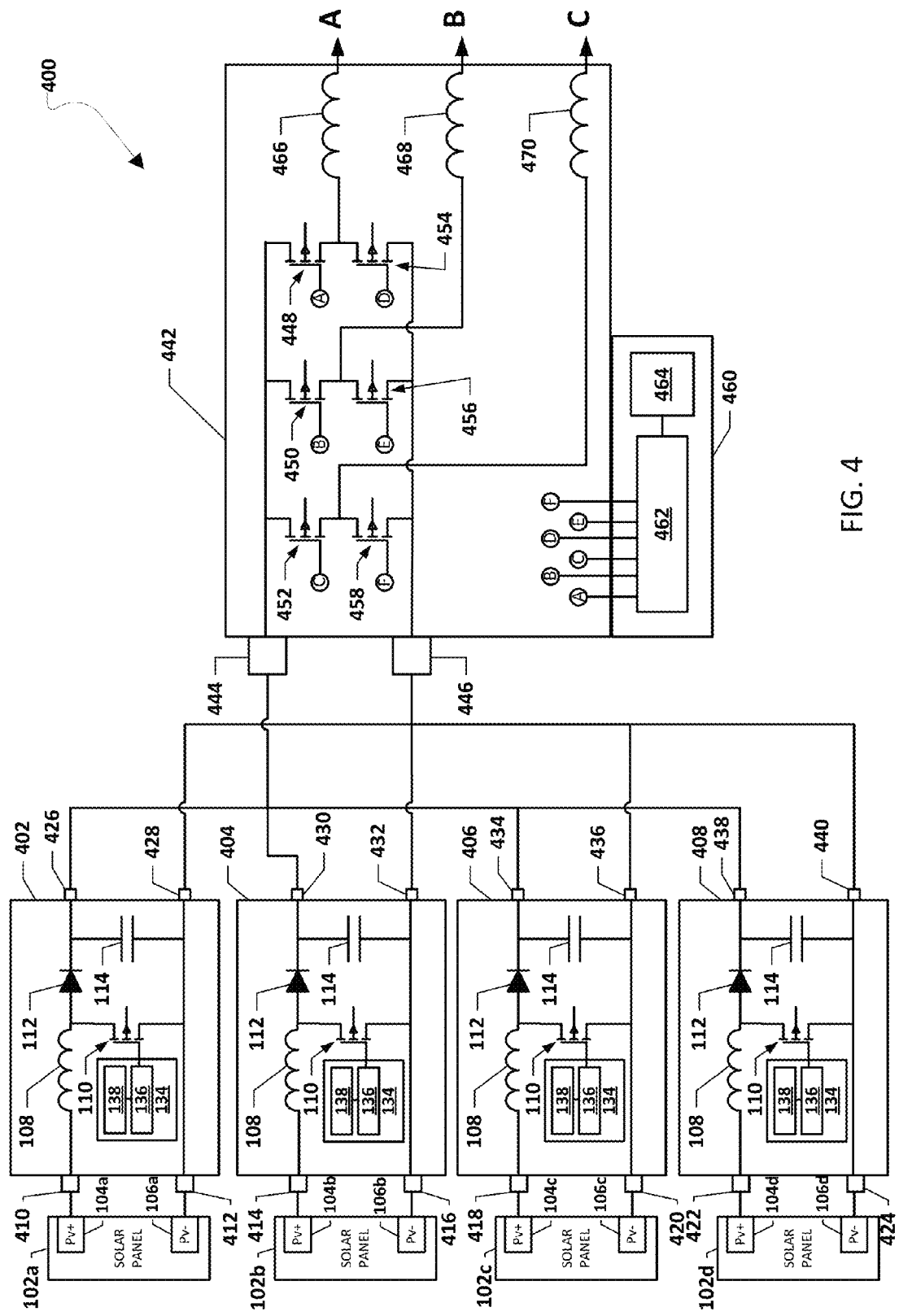
FIG. 4 is a circuit diagram of a power generation system according to a fourth embodiment.

FIG. 4. illustrates an embodiment of a power generation system 400 that is similar to power generation system 100 illustrated in FIG. 1 with the addition of multiple DC power sources, 102a, 102b, 102c, 102d, multiple DC modulators 402, 404, 406, and 408, and a combiner box 442. While illustrated with reference to four DC power sources 102a, 102b, 102c, and 102d and four DC modulators, 402, 404, 406, 408, the embodiments are not limited to four power sources and modulators, and may be applicable to an unlimited number of DC power sources and DC modulators.

Similar to solar panel 102 discussed above with reference to FIG. 1, solar panels 102a, 102b, 102c, and 102d may each have positive electrical output terminals 104a, 104b, 104c, and 104d and negative electrical output terminals 106a, 106b, 106c, and 106d.

DC modulators 402, 404, 406, and 408 may each have a positive input terminal 410, 414, 418, and 422, respectively, and a negative input terminal 412, 416, 420, and 424, respectively. DC modulators 402, 404, 406, and 408 may each be comprised of a coil 108, a boost switch 110, a diode 112, a capacitor 114, a controller 134, a programmable controller 136, and a memory 138 as described above with reference to FIG. 1. As discussed above with reference to FIG. 1, the three phase power grid line waveform may be tracked in real time and provided to the programmable controller 136. This tracked waveform may be used as a feed forward input to a control algorithm for the boost switch 110, that may enable the programmable controller 136 to create a modulated DC output to maintain a constant power output by controlling the operation of the boost switch 110. Additionally, a status of the combiner box 442 may be provided to each programmable controller 136 via a communication input (not shown). The tracked waveform or the status of the combiner box 442 may enable the programmable controller 136 to stop the DC output if the combiner box 442 goes offline (e.g., during a fire), thereby acting as a failsafe enabling the DC outputs to be disabled remotely.

The coil 108, the boost switch 110, the diode 112, the capacitor 114, the controller 134, the programmable controller 136, and the memory 138 of each DC modulator 402, 404, 406, and 408 may be connected as described above with reference to FIG. 1, and may operate together as described above with reference to FIG. 1 to generate a modulated DC output. DC modulators 402, 404, 406, and 408 may each have a positive output terminal 426, 430, 434, and 438, respectively, and a negative output terminal 428, 432, 436, and 440, respectively.

The positive output terminals 426, 430, 434, and 438 may be connected to a positive input terminal 444 of the combiner box 442. The negative output terminals 428, 432, 436, and 440 may be connected to a negative input terminal 446 of the combiner box 442.

In the combiner box 442, input terminals of switches 448, 450, and 452 may be connected in parallel with the positive input terminal 444. Input terminals of switches 454, 456, and 458 may be connected in parallel with the negative input terminal 446. As an example, switches 448, 450, 452, 454, 456, and 458 may be single MOSFETs, though any known type of technology capable of performing a switching function, including relays, transistors, bi-polar transistors, insulated-gate bipolar transistors (IGBTs), silicon carbide relays, nitride transistors, thyristors, series connected MOSFETs, thyristor emulators, and diodes in series with IGBTs may be used. Switches 448, 450, 452, 454, 456, and 458 may be similar to switches 116, 118, 120, 122, 124, and 126 described above with reference to FIG. 1. Switches 448, 450, 452, 454, 456, and 458 may be controlled via control signals from a controller 460 sent via control lines A, B, C, D, E, and F, respectively.

An output terminal of switch 448 and an output terminal of switch 454 may be connected together to form a single output terminal. Connected together in this manner, switch 448 and 454 may form a half bridge circuit. The output terminal of switch 448 and output terminal of switch 454 may be connected together to form a single output terminal that may be connected to an input terminal of coil 466. As an example, coil 466 may be an inductor, configured to output current to line A. As an example, line A may be a single line connection to a three phase power grid. The connection of switches 448 and 454, coil 466, and line A, may be similar to the connection between switches 116 and 122, coil 128, and line A discussed above with reference to FIG. 1.

An output terminal of switch 450 and an output terminal of switch 456 may be connected together to form a single output terminal. Connected together in this manner, switch 450 and 456 may form a half bridge circuit. The output terminal of switch 450 and output terminal of switch 456 may be connected together to form a single output terminal that may be connected to an input terminal of coil 468. As an example, coil 468 may be an inductor, configured to output current to line B. As an example, line B may be a single line connection to a three phase power grid. The connection of switches 450 and 456, coil 468, and line B, may be similar to the connection between switches 118 and 124, coil 130, and line B discussed above with reference to FIG. 1.

An output terminal of switch 452 and an output terminal of switch 458 may be connected together to form a single output terminal. Connected together in this manner, switch 452 and 458 may form a half bridge circuit. The output terminal of switch 452 and output terminal of switch 458 may be connected together to form a single output terminal that may be connected to an input terminal of coil 470. As an example, coil 470 may be an inductor, configured to output current to line C. As an example, line C may be a single line connection to a three phase power grid. The connection of switches 452 and 458, coil 470, and line C, may be similar to the connection between switches 120 and 126, coil 132, and line C discussed above with reference to FIG. 1.

Controller 460 may contain a programmable controller or processor 462 and a memory 464. The controller 460 may be similar to the controller 134 discussed above with reference to FIG. 1. The programmable controller 462 may allow the controller 460 to perform logic operations and to control the operation of switches 448, 450, 452, 454, 456, and 458 in response to information stored in the memory 464. The control lines A, B, C, D, E, and F may be coupled to the programmable controller 462 such that control signals from the programmable controller 462 may be sent via the control lines A, B, C, D, E, and F to the switches 448, 450, 452, 454, 456, and 458.

In operation the power generation system 400 may operate in a manner similar to power generation system 100 discussed above with reference to FIG. 1. DC current from the solar panels 102*a*, 102*b*, 102*c*, and 102*d* may be modulated by the DC modulators 402, 404, 406, and 408, respectively. The output of each DC modulator 402, 404, 406, and 408 may be individually synchronized to the three phase output envelope as discussed above with reference to FIG. 1, but the individual outputs of DC modulators 402, 404, 406, and 408 need not be synchronized together. Inductance in the output lines A, B, and C may smooth the outputs of the DC modulators 402, 404, 406, and 408, thus synchronization of the individual outputs of DC modulators 402, 404, 406, and 408 may not be necessary. In an embodiment, the power generation system 400 may combine the individual outputs of the DC modulators 402, 404, 406, and 408 in such a manner that the high frequency pulses from the DC modulators 402, 404, 406, and 408 may create an average voltage-current waveform that may mimic a desired clean modulated DC bus output.

The modulated DC output from each DC modulator 402, 404, 406, and 408 may be sent to the combiner box 442. In this manner, the inversion of the modulated DC output to an AC output may occur at a centralized location, the combiner box 442. The use of the centralized combiner box 442 may allow the sharing of output components across multiple DC input sources. The output to lines A, B, and C from the combiner box 442 may be a three phase waveform as discussed above with reference to FIG. 1.

Figure 5:
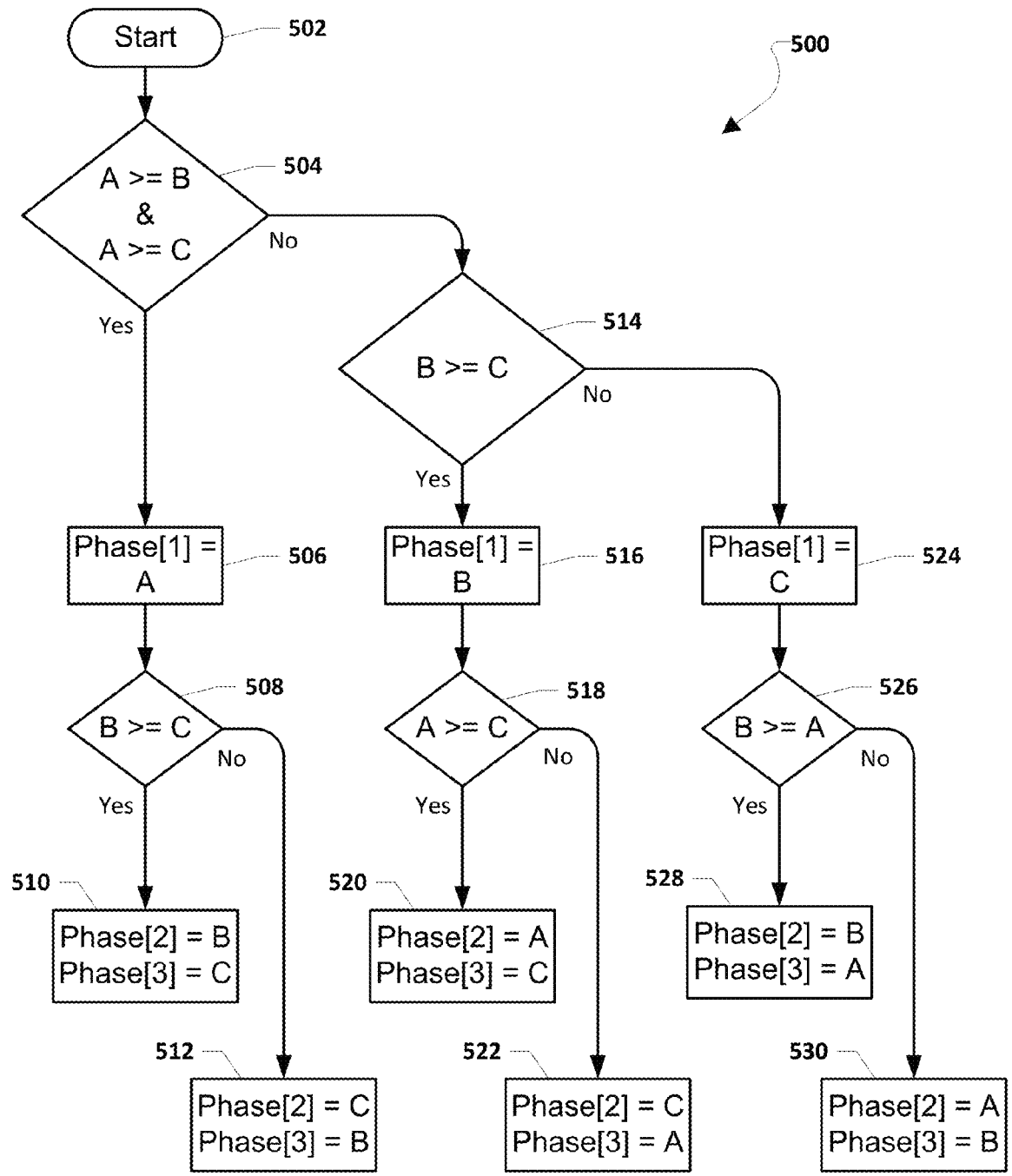
FIG. 5 is a process flow diagram illustrating an embodiment method for switch control in a power generation system.

FIG. 5 illustrates an embodiment method 500 for determining which line of a three phase power generation system represents the maximum phase, the minimum phase, and the transitioning intermediate phase. As an example, the three phase power generation system may be the power generation system 100 described above with reference to FIG. 1. The method 500 may be implemented by the controller 134 of a power generation system 100 comparing the voltages on output lines A, B, and C. In the embodiment method 500 illustrated in FIG. 5, the maximum phase at any given time may be denoted Phase [1], the intermediate phase may be denoted Phase [2], and the minimum phase may be denoted Phase [3]. A, B, and C, may represent the three output lines of a three phase power generation system, such as power generation system 100.

At block 502 the method may start. At determination block 504, the controller 134 may determine if the voltage on line A is greater than or equal to the voltage on line B and the voltage on line A is greater than or equal to the voltage on line C. If the voltage on line A is greater than or equal to the voltage on line B and greater than or equal to the voltage on line C (i.e., determination block 504="Yes"), at block 506 the controller 134 may assign line A as the maximum phase, Phase [1]. At determination block 508, the controller 134 may determine if the voltage on line B is greater than or equal to the voltage on line C. If the voltage on line B is greater than or equal to the voltage on line C (i.e., determination block 508="Yes"), at block 510 the controller 134 may assign line B as the intermediate phase, Phase [2], and assign line C as the minimum phase, Phase [3]. If the voltage on line B is less than the voltage on line C (i.e., determination block 508="No"), at block 512 the controller 134 may assign line C as the intermediate phase, Phase [2], and assign line B as the minimum phase, Phase [3].

If the voltage on line A is less than B and less than C (i.e., determination block 504="No"), at determination block 514 the controller 134 may determine if the voltage on line B is greater than or equal to the voltage on line C. If the voltage on line B is greater than or equal to the voltage on line C (i.e., determination block 514="Yes"), at block 516 the controller 134 may assign line B as the maximum phase, Phase [1]. At determination block 518, the controller 134 may determine if the voltage on line A is greater than or equal to the voltage on line C. If the voltage on line A is greater than or equal to the voltage on line C (i.e., determination block 518="Yes"), at block 520 the controller 134 may assign line A as the intermediate phase, Phase [2], and assign line C as the minimum phase, Phase [3]. If the voltage on line A is less than the voltage on line C (i.e., determination block 518="No"), at block 522 the controller 134 may assign line C as the intermediate phase, Phase [2], and assign line A as the minimum phase, Phase [3].

If the voltage on line B is less than the voltage on line C (i.e., determination block 514="No"), at block 524 the programmable controller may assign line C as the maximum phase, Phase [1]. At determination block 526, the controller 134 may determine if the voltage on line B is greater than or equal to the voltage on line A. If the voltage on line B is greater than or equal to the voltage on line A (i.e., determination block 526="Yes"), at block 528 the controller 134 may assign line B as the intermediate phase, Phase [2], and assign line A as the minimum phase, Phase [3]. If the voltage on line B is less than the voltage on line A (i.e., determination block 526="No"), at block 530 the controller 134 may assign line A as the intermediate phase, Phase [2], and assign line B as the minimum phase, Phase [3].

Figure 6A:
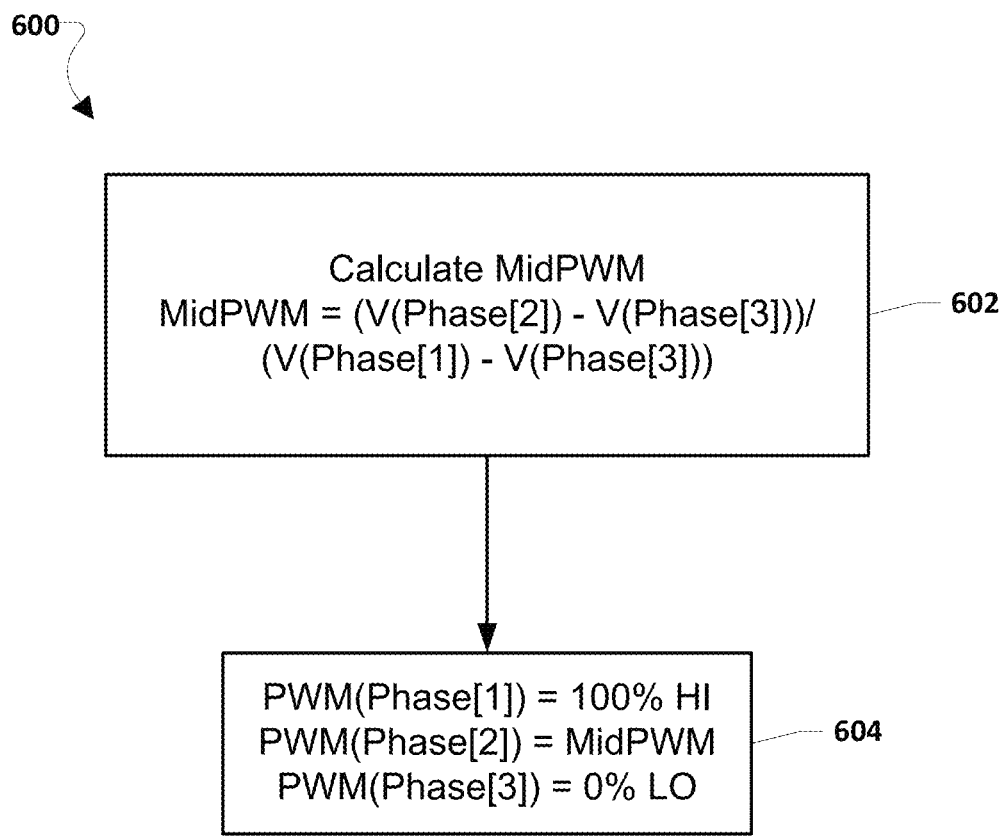
FIG. 6A is a process flow diagram illustrating an embodiment method for controlling pulse width modulation in a power generation system.

FIG. 6A illustrates an embodiment method 600 for determining the level of pulse width modulation to apply to the phases of three phase power generation system that may be used in conjunction with method 500 described above. As discussed above, only the intermediate phase may need to be pulse width modulated. The switching period for the intermediate phase may be determined by comparing the voltage differences in the three lines and using that comparison to assign a percentage of time the intermediate line should be switched on. To determine the duty cycle for switching the line associated with the intermediate phase at a given instant, at block 602 the controller 134 may calculate the intermediate phase PWM percentage (MidPWM). At block 602 the controller 134 may determine the MidPWM to be equal to the difference between the instant voltage at the intermediate phase (Phase[2]) and the instant voltage at the minimum phase (Phase[3]) over the difference between the instant voltage at the maximum phase (Phase[1]) and the instant voltage at the minimum phase (Phase[2]). The determined MidPWM may represent a percentage of the duty cycle for the pulse width modulation applied to the maximum phase (Phase[1]) for which to enable voltage to flow to the intermediate phase (Phase[2]). At block 604 the controller 134 may apply pulse width modulated signals to the line assigned as the maximum phase (Phase[1]) for 100% of the duty cycle, may apply pulse width modulated signals to the line assigned as the intermediate phase (Phase[2]) for the MidPWM percentage of the duty cycle, and may apply no pulse width modulated signals to the line assigned as the minimum phase (Phase[3]).

Figure 6B:
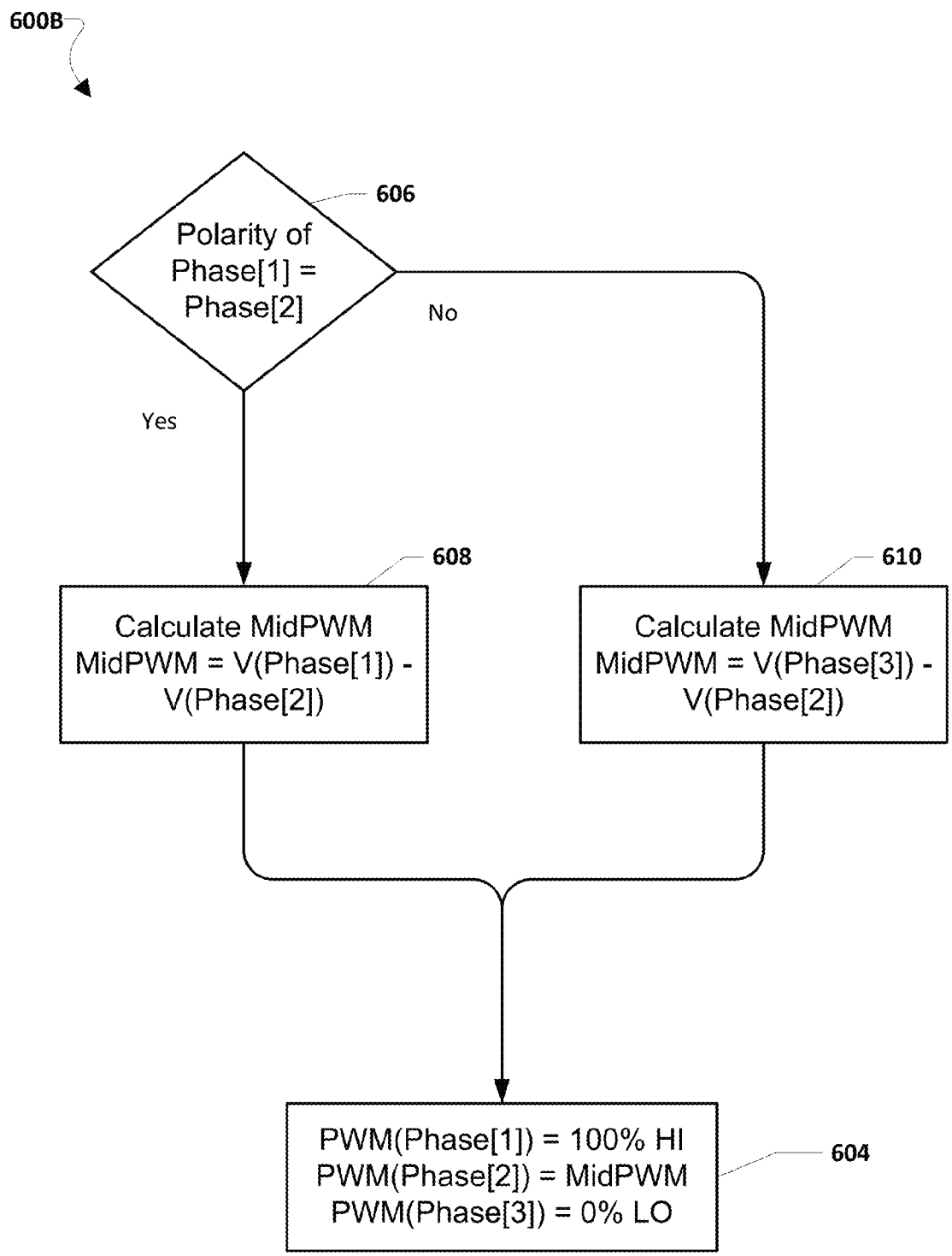
FIG. 6B is a process flow diagram illustrating another embodiment method for controlling pulse width modulation in a power generation system.

FIG. 6B illustrates an alternative embodiment method 600B for determining the level of pulse width modulation to apply to the phases of three phase power generation system that may be used in conjunction with method 500 described above. As discussed above, only the intermediate phase may need to be pulse width modulated. Method 600B may implement a Discontinuous Current Mode (DCM) in which the current in the transitioning phase may be determined primarily by the voltage difference between the other phase of the same polarity, and the voltage of the transitioning phase line to assign a percentage of time the intermediate line should be switched on. To determine the duty cycle for switching the line associated with the intermediate phase at a given instant, at determination block 606 the controller 134 may determine if the polarity of the maximum phase (Phase[1]) is equal to that of the intermediate phase (Phase[2]). If the maximum phase (Phase[1]) and the intermediate phase (Phase[2]) have the same polarity (i.e., determination block 606="Yes"), at block 608 the controller 134 may determine the MidPWM to be equal to the difference between the instant voltage at the maximum phase (Phase[1]) and the intermediate phase (Phase[2]). As discussed above with reference to FIG. 6A, at block 604 the controller 134 may apply pulse width modulated signals to the line assigned as the maximum phase (Phase[1]) for 100% of the duty cycle, may apply pulse width modulated signals to the line assigned as the intermediate phase (Phase[2]) for the MidPWM percentage of the duty cycle, and may apply no pulse width modulated signals to the line assigned as the minimum phase (Phase[3]). If the maximum phase (Phase[1]) is not the same polarity as the intermediate phase (Phase[2]) (i.e., determination block 606="No"), at block 610 the controller 134 may determine the MidPWM to be equal to the difference between the instant voltage at the minimum phase (Phase[3]) and the intermediate phase (Phase[2]). As discussed above with reference to FIG. 6A, at block 604 the controller 134 may apply pulse width modulated signals to the line assigned as the maximum phase (Phase[1]) for 100% of the duty cycle, may apply pulse width modulated signals to the line assigned as the intermediate phase (Phase[2]) for the MidPWM percentage of the duty cycle, and may apply no pulse width modulated signals to the line assigned as the minimum phase (Phase[3]).

Figure 7A:
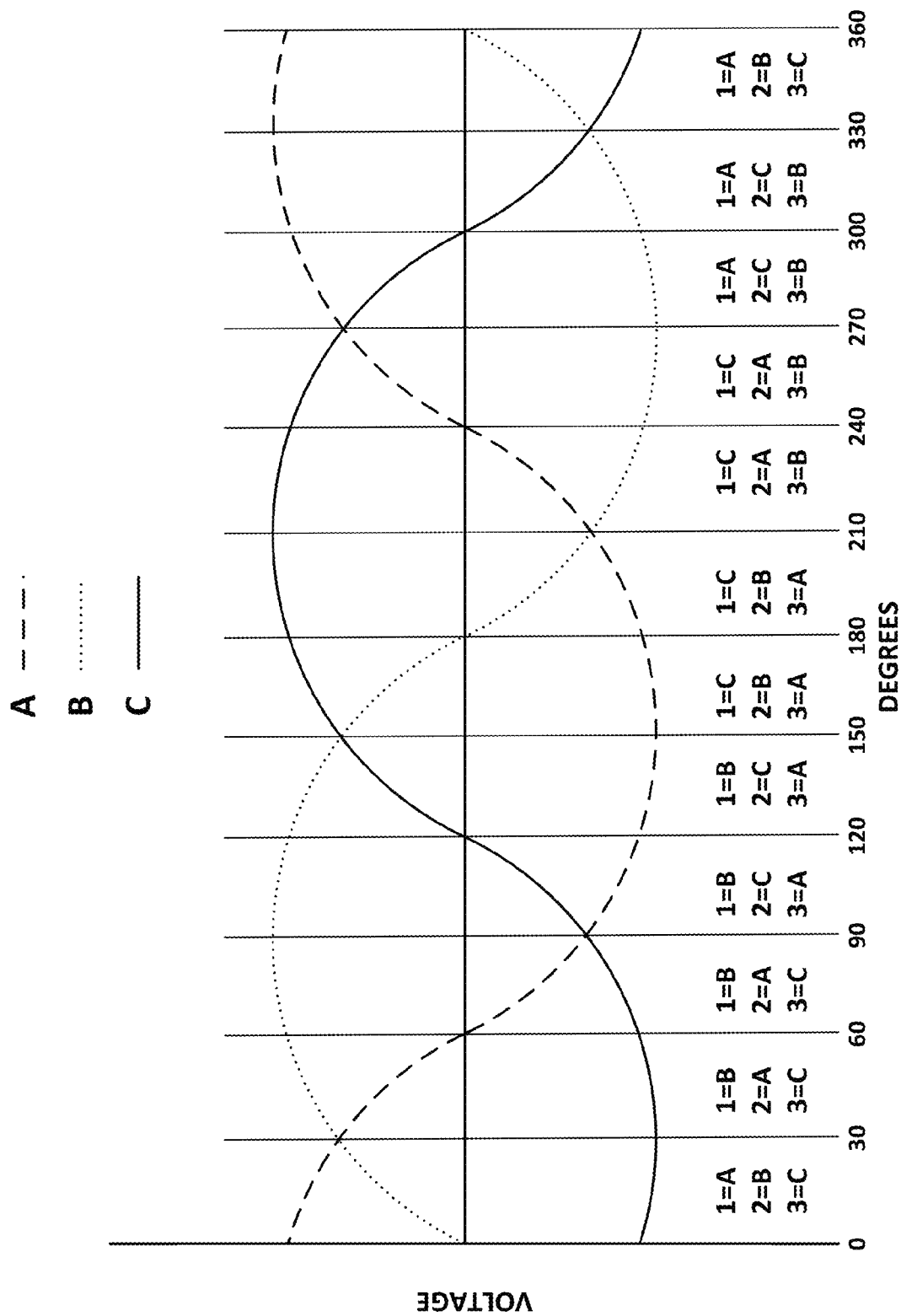
FIG. 7A is a graph relating a three phase voltage waveform to switching controls.

FIG. 7A illustrates the voltage waveforms of three phase electrical power that may be created by implementing the methods 500 and 600 or 600B in the power generation system 100. The three sinusoidal voltage waveforms correspond to the three voltage outputs on output lines A, B, and C of power generation system 100. The voltage waveform on line A is represented by the dashed line, the voltage waveform on line B is represent by the dotted line, and the voltage waveform on line C is represented by the solid line. The graph depicts the relationship of the voltage waveforms during one 360 degree switching cycle. While the relationship of the phases illustrated in FIG. 7A is shown as A-B-C, the phases generated by power generation system 100 may be in any order, such as A-C-B, and the embodiments should not be limited to the phase relationship shown. The controller 134 of power generation system 100 may control switches 116, 118, 120, 122, 124, and 126 as necessary to match any desired line phase relationship or polarity.

For the first 30 degree portion of the cycle, line A may be the maximum phase, Phase [1], line B may be the intermediate phase, Phase [2], and lines C may be the minimum phase, Phase [3]. To establish line A as the maximum phase, the controller 134 may activate switch 116 and open switch 122. To establish line C as the minimum phase, the controller 134 may activate switch 126 and open switch 120. Line B may be the intermediate phase, and initially at the 0 degree point the controller 134 may open both switches 118 and 124. Over the period from 0 to 30 degrees, the intermediate phase voltage on line B may increase, while the maximum phase voltage on line A may decrease. The controller 134 may activate switch 118 intermittently thereby implementing method 600 described above. When switch 118 is activated, line B, the intermediate phase, may steal current from line A resulting in a lower voltage at line A and a rise in voltage at line B. Switch 126 may remain active, which may result in the voltage on line C being the minimum phase and tracking the bottom of the three phase envelope.

After the 30 degree point, the voltage on line B may be greater than the voltage on line A, and line B may be the maximum phase, Phase[1], line A may be the intermediate phase, Phase[2], and line C may remain the minimum phase, Phase [3]. Over the period from 30 to 60 degrees, the controller 134 may activate switch 118 and open switch 124 to establish line B as the maximum phase, and leave switch 120 open and switch 126 activated thereby keeping line C as the minimum phase. The controller 134 may now leave switch 122 open and intermittently activate switch 116 thereby implementing method 600 described above. When switch 116 is activated, line A, the intermediate phase, may steal current from line B resulting in a lower voltage at line B and a rise in voltage at line A.

At the 60 degree point, the voltage on line A may reach the zero crossing point where the voltage shifts from a positive voltage value to a negative voltage value. Over the period from 60 to 90 degrees, the controller 134 may leave switches 118 and 126 active and switches 120 and 124 open as line B remains the maximum phase and line C the minimum phase. To provide a negative voltage value to line A, the controller 134 may now open switch 116 and intermittently activate switch 122 thereby implementing method 600 described above. When switch 122 is activated, line A, the intermediate phase, may steal current from line C, resulting in a less negative voltage at line C.

After the 90 degree point, the voltage on line C may be greater than the voltage on line A. Line B may remain the maximum phase, Phase[1], line C may be the intermediate phase, Phase[2], and line A may now be the minimum phase, Phase[3]. Over the period from 90 to 120 degrees, line B may remain the maximum phase, and the controller 134 may leave switch 118 activated and switch 124 open. The controller 134 may leave switch 116 open and activate switch 122 thereby establishing line A as the minimum phase. The controller 134 may now leave switch 120 open and intermittently activate switch 126 thereby implementing method 600 described above. When switch 126 is activated, line C, the intermediate phase, may steal current from line A, resulting in a less negative voltage at line A.

At the 120 degree point, the voltage on line C may reach the zero crossing point where the voltage shifts from a negative voltage value to a positive voltage value. Over the period from 120 to 150 degrees, the controller 134 may leave switches 122 and 118 active and switches 116 and 124 open as line B remains the maximum phase and line A the minimum phase. To provide a positive voltage value to line C, the controller 134 may now open switch 126 and intermittently activate switch 120 thereby implementing method 600 described above. When switch 120 is activated, line C, the intermediate phase, may steal current from line B resulting in a lower voltage at line B and a rise in voltage at line C.

After the 150 degree point, the voltage on line C may be greater than the voltage on line B, and line C may be the maximum phase, Phase[1], line B may be the intermediate phase, Phase[2], and line A may remain the minimum phase, Phase [3]. Over the period from 150 to 180 degrees, the controller 134 may activate switch 120 and open switch 126 to establish line C as the maximum phase, and leave switch 116 open and switch 122 activated thereby keeping line A as the minimum phase. The controller 134 may now leave switch 124 open and intermittently activate switch 118 thereby implementing method 600 described above. When switch 118 is activated, line B, the intermediate phase, may steal current from line C resulting in a lower voltage at line C and a rise in voltage at line B.

At the 180 degree point, the voltage on line B may reach the zero crossing point where the voltage shifts from a positive voltage value to a negative voltage value. Over the period from 180 to 210 degrees, the controller 134 may leave switches 120 and 122 active and switches 126 and 116 open as line C remains the maximum phase and line A the minimum phase. To provide a negative voltage value to line B, the controller 134 may now open switch 118 and intermittently activate switch 124 thereby implementing method 600 described above. When switch 124 is activated, line B, the intermediate phase, may steal current from line A, resulting in a less negative voltage at line A.

After the 210 degree point, the voltage on line A may be greater than the voltage on line B. Line C may remain the maximum phase, Phase[1], line A may be the intermediate phase, Phase[2], and line B may now be the minimum phase, Phase[3]. Over the period from 210 to 240 degrees, line C may remain the maximum phase, and the controller 134 may leave switch 120 activated and switch 126 open. The controller 134 may leave switch 118 open and activate switch 124 thereby establishing line B as the minimum phase. The controller 134 may now leave switch 116 open and intermittently activate switch 122 thereby implementing method 600 described above. When switch 122 is activated, line A, the intermediate phase, may steal current from line B resulting in a less negative voltage at line B.

At the 240 degree point, the voltage on line A may reach the zero crossing point where the voltage shifts from a negative voltage value to a positive voltage value. Over the period from 240 to 270 degrees, the controller 134 may leave switches 120 and 124 active and switches 118 and 126 open as line C remains the maximum phase and line B the minimum phase. To provide a positive voltage value to line A, the controller 134 may now open switch 122 and intermittently activate switch 116 thereby implementing method 600 described above. When switch 116 is activated, line A, the intermediate phase, may steal current from line C resulting in a lower voltage at line C and a rise in voltage at line A.

After the 270 degree point, the voltage on line A may be greater than the voltage on line C, and line A may be the maximum phase, Phase[1], line C may be the intermediate phase, Phase[2], and line B may remain the minimum phase, Phase [3]. Over the period from 270 to 300 degrees, the controller 134 may activate switch 116 and open switch 122 to establish line A as the maximum phase, and leave switch 118 open and switch 124 activated thereby keeping line B as the minimum phase. The controller 134 may now leave switch 126 open and intermittently activate switch 120 thereby implementing method 600 described above. When switch 120 is activated, line C, the intermediate phase, may steal current from line A resulting in a lower voltage at line A and a rise in voltage at line C.

At the 300 degree point, the voltage on line C may reach the zero crossing point where the voltage shifts from a positive voltage value to a negative voltage value. Over the period from 300 to 330 degrees, the controller 134 may leave switches 116 and 124 active and switches 118 and 122 open as line A remains the maximum phase and line B the minimum phase. To provide a negative voltage value to line C, the controller 134 may now open switch 120 and intermittently activate switch 126 thereby implementing method 600 described above. When switch 126 is activated, line C, the intermediate phase, may steal current from line B, resulting in a less negative voltage at line C.

After the 330 degree point, the voltage on line B may be greater than the voltage on line C. Line A may remain the maximum phase, Phase[1], line B may be the intermediate phase, Phase[2], and line C may now be the minimum phase, Phase[3]. Over the period from 330 to 360 degrees, line A may remain the maximum phase, and the controller 134 may leave switch 116 activated and switch 122 open. The controller 134 may leave switch 120 open and activate switch 126 thereby establishing line C as the minimum phase. The controller 134 may now leave switch 118 open and intermittently activate switch 124 thereby implementing method 600 described above. When switch 124 is activated, line B, the intermediate phase, may steal current from line C resulting in a less negative voltage at line C.

Figure 7B:
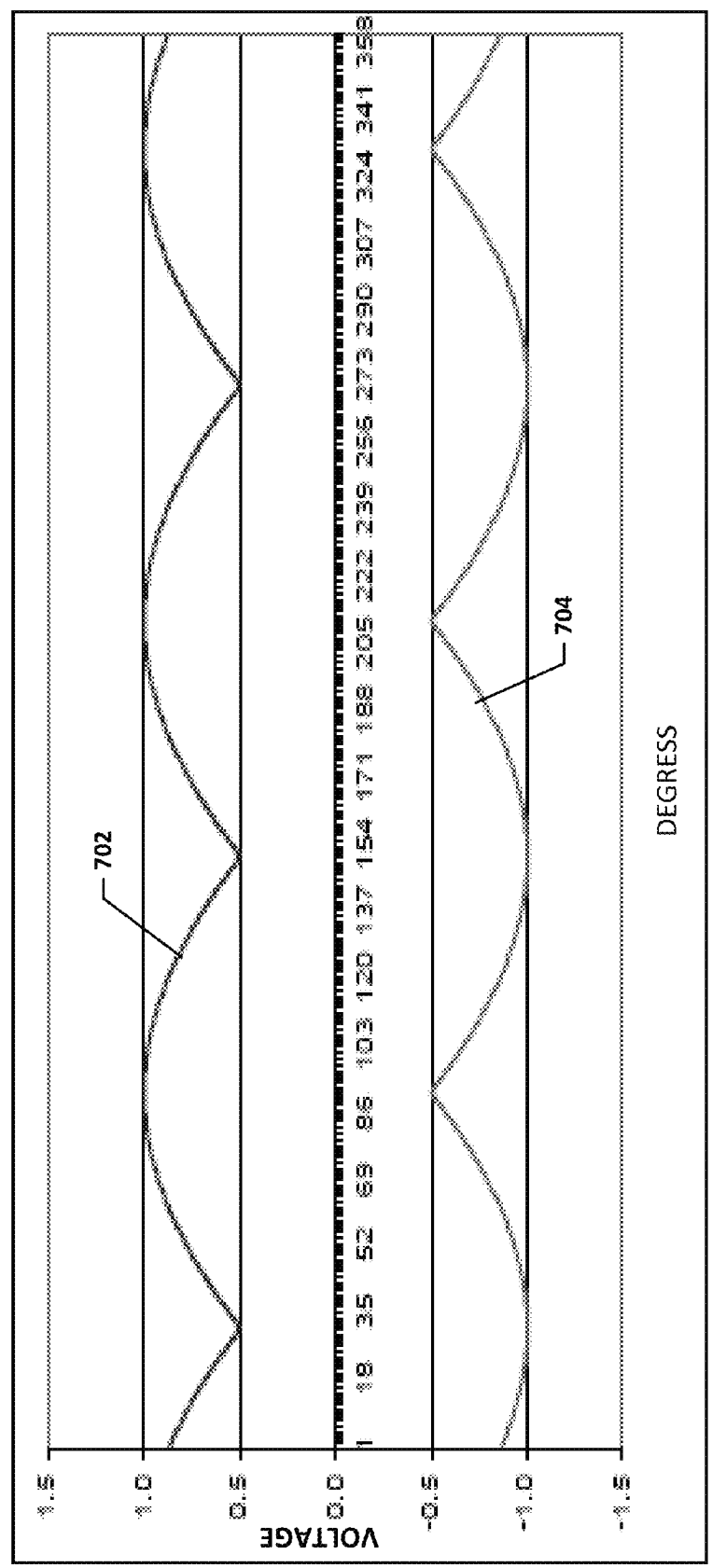
FIG. 7B is a graph of a three phase voltage envelope.

FIG. 7B illustrates the voltage envelope of three phase electrical power that may be created by implementing the methods 500 and 600 or 600B in the power generation system 100. The voltage envelope may include a maximum signal 702 and a minimum signal 704.

Figure 7C:
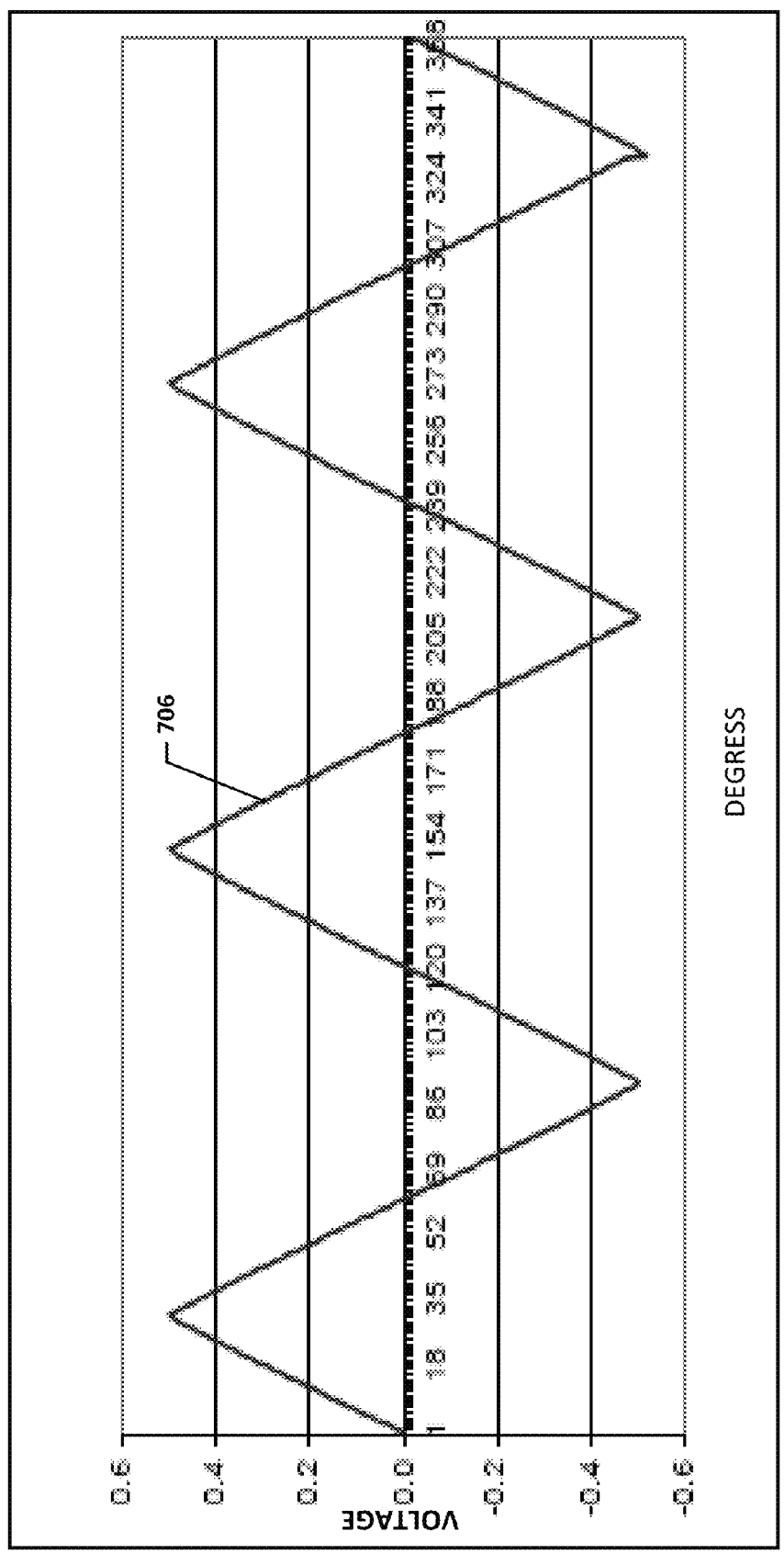
FIG. 7C is a graph of an absolute minimum signal transitioning between outer envelope pairs.

FIG. 7C illustrates the absolute minimum signal 706 that may be created by implementing the methods 500 and 600 or 600B in the power generation system 100. The absolute minimum signal 706 may transition between the outer envelope pairs.

Figure 8:
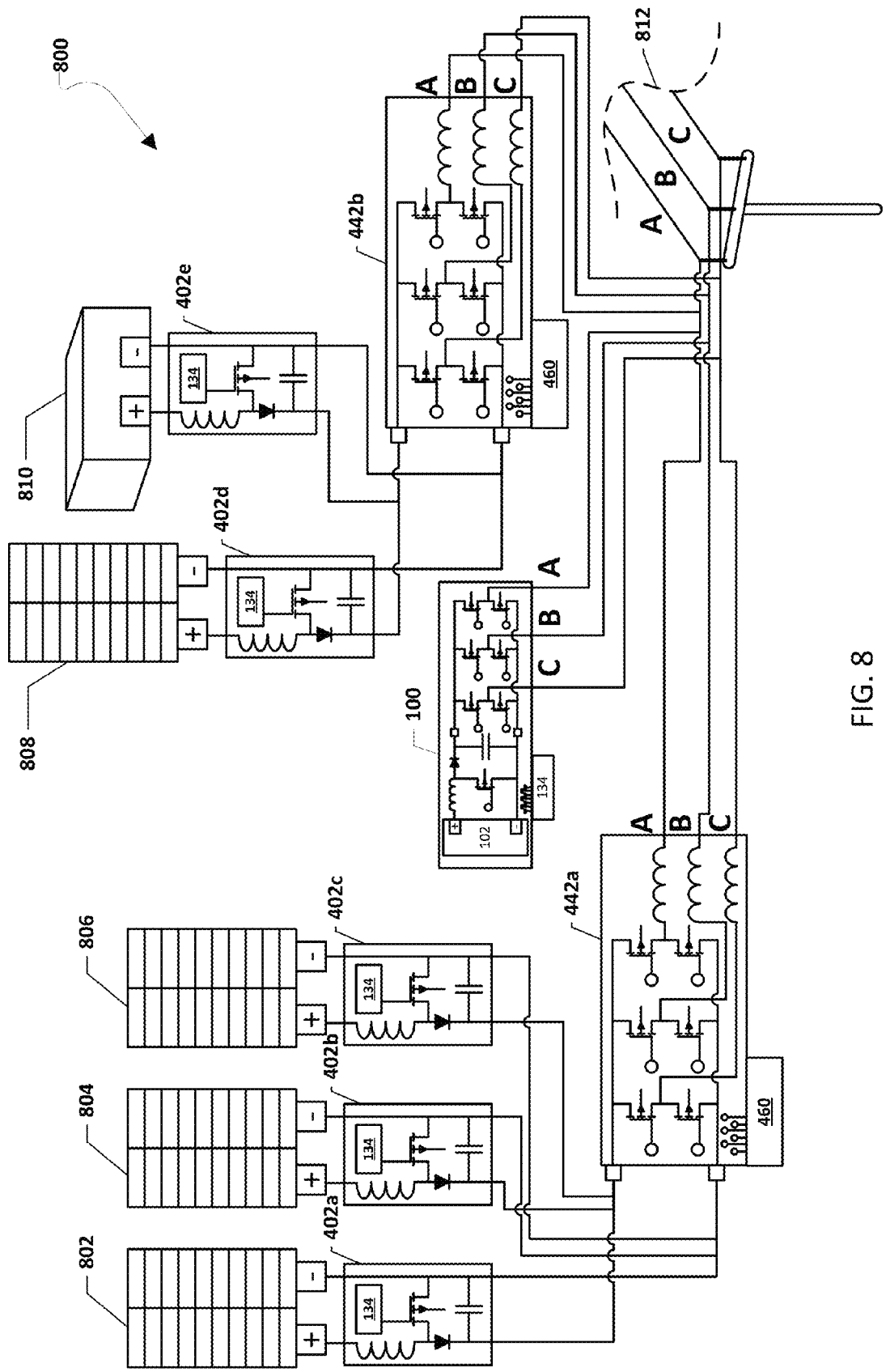
FIG. 8 is component block diagram of a power generation system according to a fourth embodiment.

FIG. 8 illustrates components of a three phase power generation system 800 for delivering three phase power to a three phase power grid 812 according to the various embodiments. The three phase power generation system 800 may be comprised of multiple DC power sources, such as solar panels 802, 804, 806, and 808, power generation system 100 as discussed above with reference to FIG. 1, and an energy storage system 810. The energy storage system 810 may be any DC storage system such as a battery or capacitor bank.

Solar panels 802, 804, and 806 may be connected to DC modulators 402*a*, 402*b*, and 402*c*, respectively. DC modulator 402*d* may be connected to solar panel 808 and DC modulator 402*e* may be connected to the energy storage system 810. DC modulators 402*a*, 402*b*, 402*c*, 402*d*, and 402*e* may be similar to DC modulator 402 discussed above with reference to FIG. 4, and DC modulators 402*a*, 402*b*, 402*c*, 402*d*, and 402*e* may create a modulated DC output from the DC input each receives from DC power sources 802, 804, 806, 808, and 810, respectively. DC modulators 402*a*, 402*b*, and 402*c* may be connected to combiner box 442*a*, and the modulated DC output of DC modulators 402*a*, 402*b*, 402*c*, 402*d*, and 402*e* may be input into combiner box 442*a* in a manner similar to that discussed above with reference to FIG. 4. DC modulators 402*d* and 402*e* may be connected to combiner box 442*b*, and the modulated DC output of DC modulators 402*d* and 402*e* may be input into combiner box 442*b* in a manner similar to that discussed above with reference to FIG. 4. The outputs of both combiner boxes 442*a* and 442*b* may be three phase AC power output lines A, B, and C similar to that of combiner box 442 discussed above with reference to FIG. 4. The power generation system 100 may include a solar panel 102 and the various components discussed above with reference to FIG. 1, and may output three phase AC power on output lines A, B, and C as discussed above with reference to FIG. 1. The output lines A, B, and C, of combiner boxes 442*a* and 442*b* and the power generation system 100 may be connected together and connected to the three corresponding lines A, B, and C of the three phase power grid 812.

In operation, solar panels 802, 804, 806, and 808, and energy storage system 810 may all produce a DC current output. The DC current output from each DC power source 802, 804, 806, 808, and 810 may be modulated by its respective DC modulator 402*a*, 402*b*, 402*c*, 402*d*, and 402*e* to produce a modulated DC output similar to that of power generation systems 100 and 400 discussed above with reference to FIG. 1 and FIG. 4. The modulated DC outputs of DC modulators 402*a*, 402*b*, and 402*c*, may be input to combiner box 442*a* and converted to three phase AC power in a manner similar to power generation systems 100 and 400 discussed above with reference to FIG. 1 and FIG. 4. The modulated DC outputs of DC modulators 402*d* and 402*e* may be input to combiner box 442*b* and converted to three phase AC power in a manner similar to power generation systems 100 and 400 discussed above with reference to FIG. 1 and FIG. 4. The power generation system 100 may generate a three phase AC power output as discussed above with reference to FIG. 1. The three phase AC power outputs of combiner boxes 442*a* and 442*b* and the power generation system 100 may be combined and output to the three phase power grid 812.

Figure 9A:
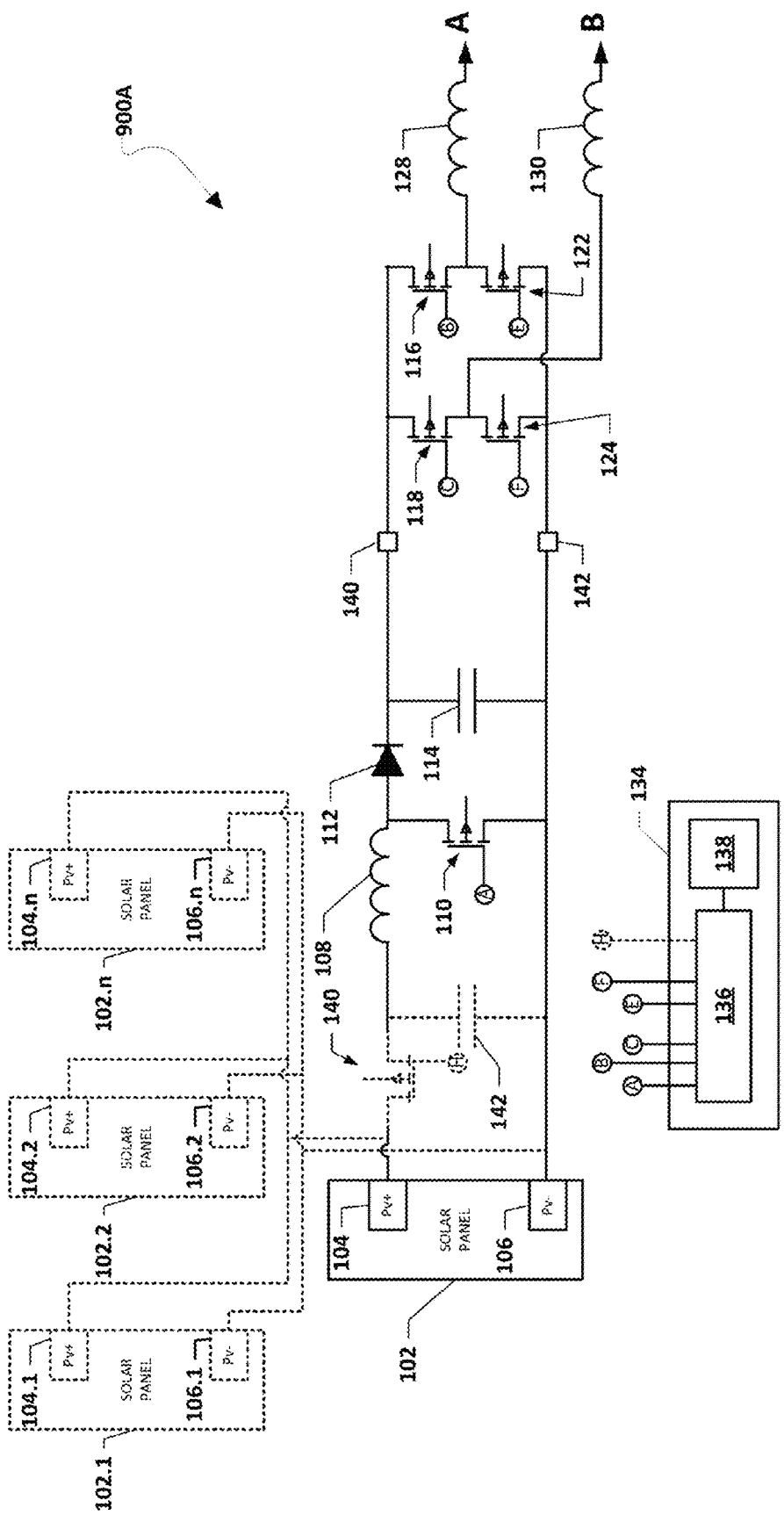
FIG. 9A is a circuit diagram of a power generation system according to a fifth embodiment.
Figure 9B:
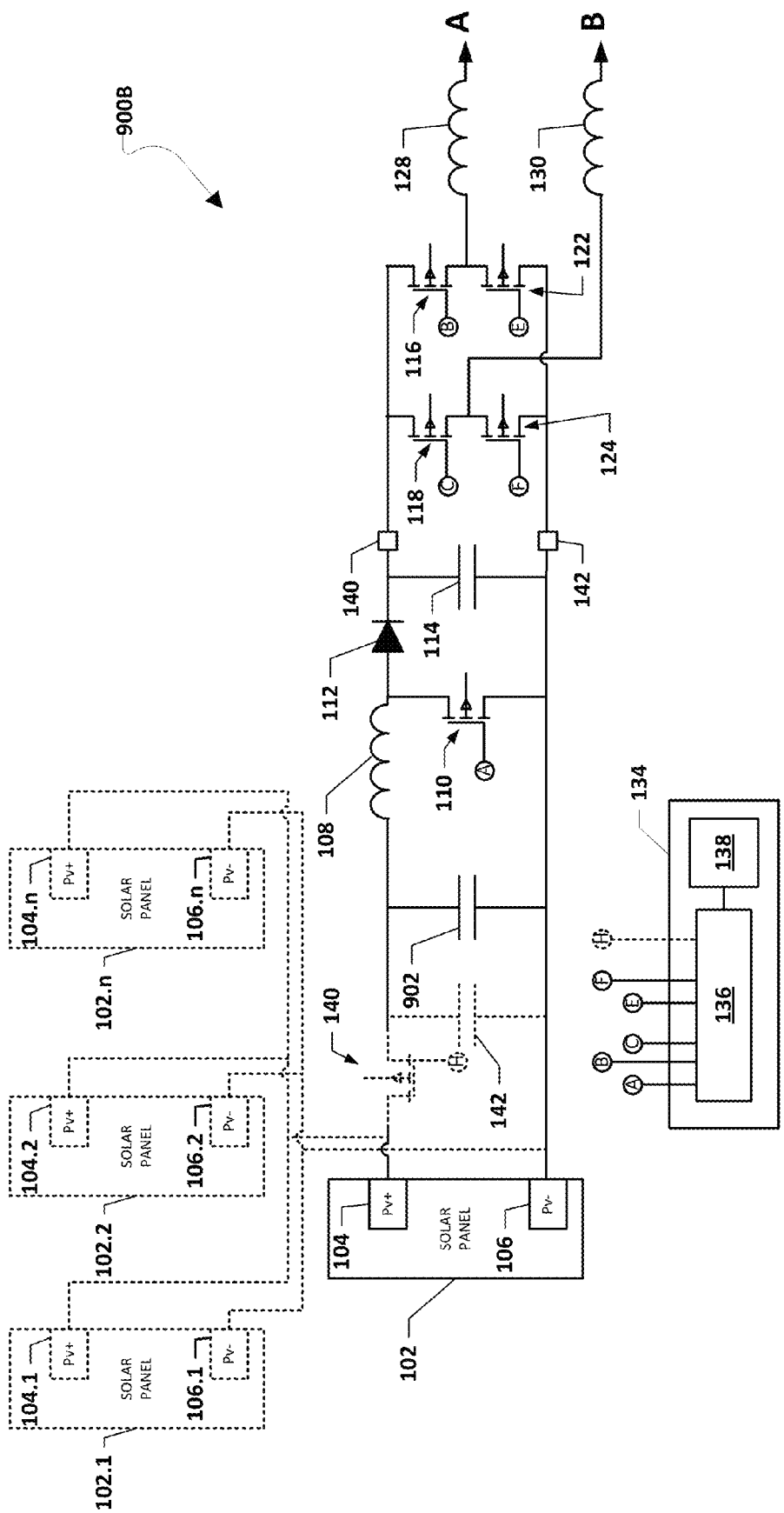
FIG. 9B is a circuit diagram of a power generation system according to a sixth embodiment.
Figure 9C:
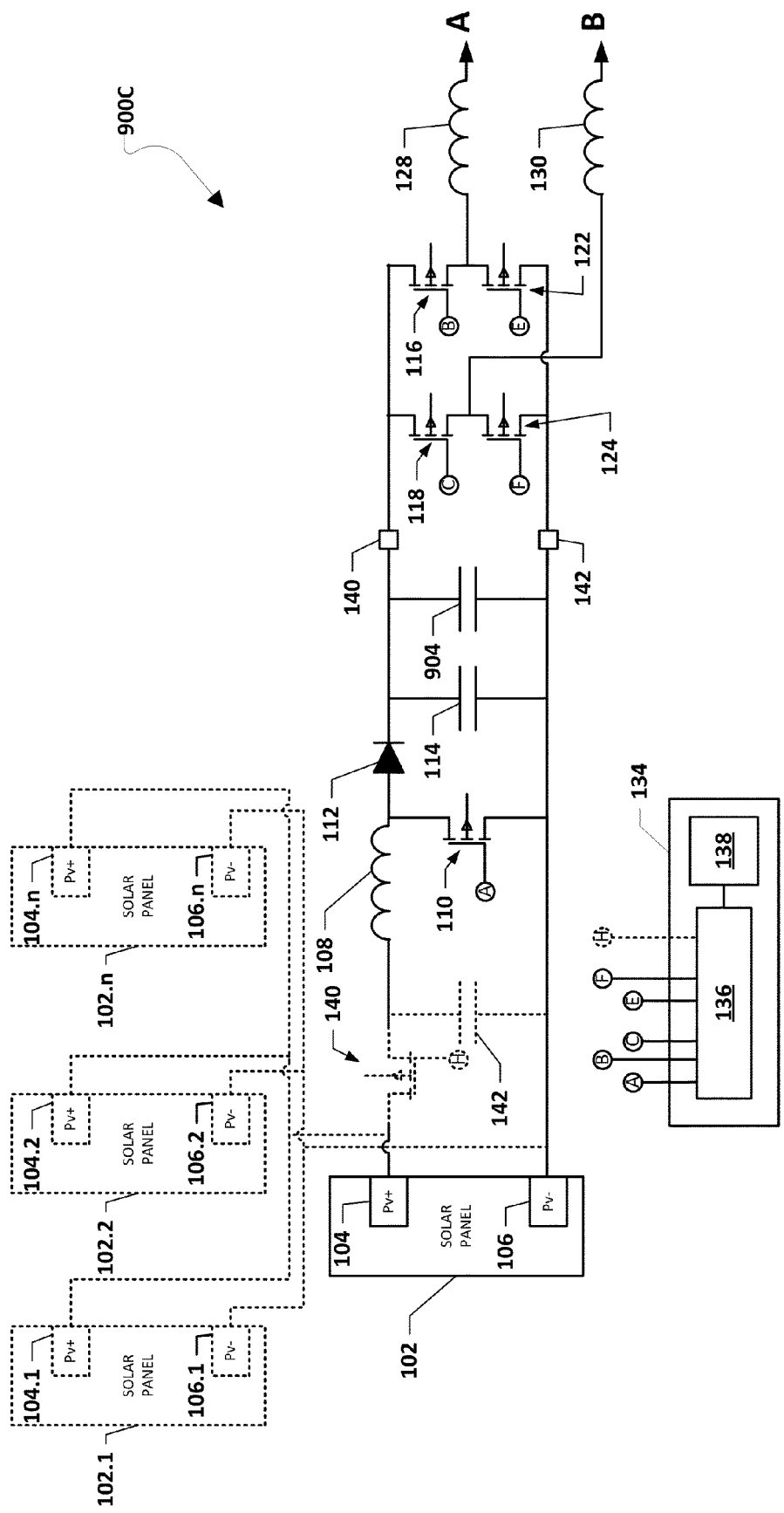
FIG. 9C is a circuit diagram of a power generation system according to a seventh embodiment.

FIGS. 9A, 9B, and 9C illustrate power generation systems 900A, 900B, and 900C, respectively, similar to the power generation system 100 illustrated in FIG. 1, except that power generation systems 900A, 900B, and 900C may generate two phase AC power.

FIG. 9A illustrates a power generation system 900A similar to the power generation system 100 illustrated in FIG. 1, except that switches 120 and 126, coil 132, control lines D and G, and line C are removed. Additionally, a two phase power grid waveform, rather than a three phase power grid line waveform may be stored in the memory 138 or may be tracked in real time and provided to the programmable controller 136.

In operation the power generation system 900A may operate in a manner similar to the power generation system 100 described above with reference to FIG. 1, except that two phase AC power may be output via lines A and B.

When exposed to light the solar panel 102 may generate current. The boost switch 110 may be opened and closed by the controller 134 via a control signal on control line A to build current in the coil 108. In this manner, the solar panel 102 voltage may be boosted to the envelope of the three phase waveform, but need not be boosted above the line voltage. The solar panel 102 voltage input may be allowed to float with the solar panel 102 tied to the minimum phase input, i.e., the negative rail. In this manner, the absolute solar panel 102 voltage may float up and down following the lower envelope shape of the two phase waveform.

As the boost switch 110 is opened and closed a single output pulse may be sent through the diode 112 and across the capacitor 114 to the input terminals 140 and 142. The output pulse may be a pulse width modulated pulse that may be translated into a pulse amplitude modulated (PAM) current pulse. The voltage at the capacitor 114 may track the magnitude of the maximum and minimum two phase power envelopes and the voltage at the capacitor 114 may vary over time. The current and power transferred to the lines A and B may be controlled by the operation of switches 116, 118, 122, and 124. The controller 134 may open and close switches 116, 118, 122, and 124 via control signals on control lines B, C, E, and F, respectively, to control the flow of current to lines A and B. As an example, in an initial state, the controller may close switches 116 and 124, and open switches 118 and 122. In this manner, positive current pulses may be provided to line A and the negative current pulses to line B. In this initial state, line A may represent the maximum two phase power envelope and line B may represent the minimum two phase power envelope.

FIG. 9B illustrates a power generation system 900B similar to the power generation system 900A illustrated in FIG. 9A, with the addition of an intermediate storage capacitor 902 placed across the solar panel 102 outputs 104 and 106. An input terminal of the intermediate storage capacitor 902 may be connected to the positive electrical output 104 of the solar panel 102, and an output terminal of the intermediate storage capacitor 902 may be connected to the negative electrical output 106 of the solar panel 102. The intermediate storage capacitor 902 may be any type of capacitor. The placement of the intermediate storage capacitor 902 across the outputs 104 and 106 of the solar panel 102 may not be preferred because it may require a larger capacitance in the intermediate capacitor 902 and may impact the Maximum Power Point (MPPT) of the power generation system 900B.

FIG. 9C illustrates a power generation system 900C similar to the power generation system 900A illustrated in FIG. 9A, with the addition of an intermediate storage capacitor 904 placed across the capacitor 114. An input terminal of the intermediate storage capacitor 904 may be connected to an input terminal of the capacitor 114, and an output terminal of the intermediate storage capacitor 904 may be connected to the input terminal of the capacitor 114. The intermediate storage capacitor 904 may be any type of capacitor, such as a 30 μF, 50 μF, or 30-50 μF capacitor. The placement of the intermediate storage capacitor 904 across the capacitor 114 may enable the intermediate storage capacitor 904 to store excess power and provide it back into the power generation system 900C when needed.

In operation the intermediate capacitor 904 may store excess power and allow the excess power to be placed back into the power generation system 900C when needed. The excess power may be provided at or above Vrms at the lowest point for the voltage of the intermediate capacitor 904 when the output power exceeds the average input power.

Figure 10:
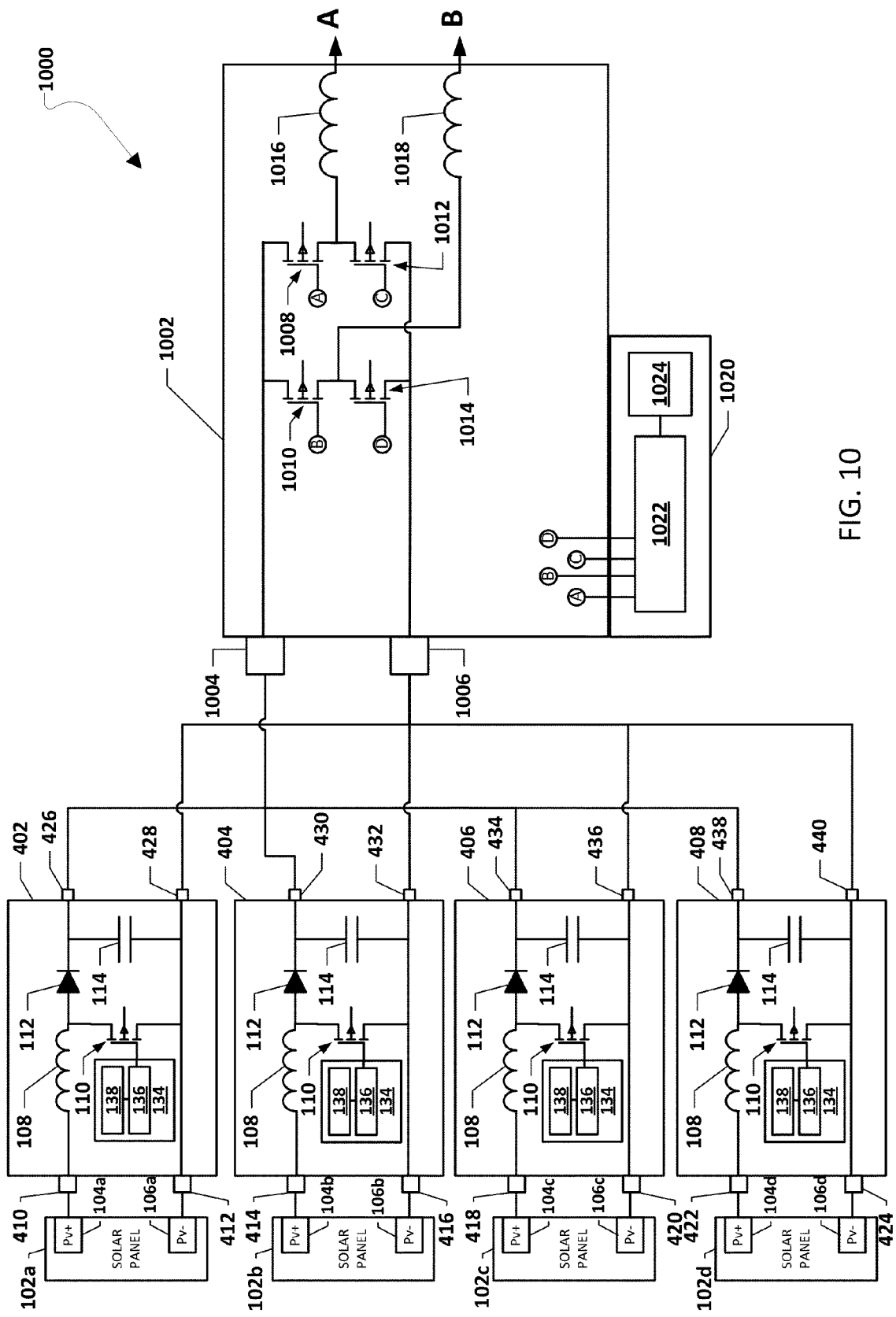
FIG. 10 is a circuit diagram of a power generation system according to an eighth embodiment.

FIG. 10. illustrates an embodiment of a power generation system 1000 that is similar to the power generation system 900A illustrated in FIG. 9A with the addition of multiple DC power sources, 102a, 102b, 102c, 102d, multiple DC modulators 402, 404, 406, and 408 similar to those of power generation system 400 illustrated in FIG. 4, and a combiner box 1002. While illustrated with reference to four DC power sources 102a, 102b, 102c, and 102d and four DC modulators, 402, 404, 406, 408, the embodiments are not limited to four power sources and modulators, and may be applicable to an unlimited number of DC power sources and DC modulators.

Similar to the solar panel 102 discussed above with reference to FIG. 9A, solar panels 102a, 102b, 102c, and 102d may each have positive electrical output terminals 104a, 104b, 104c, and 104d and negative electrical output terminals 106a, 106b, 106c, and 106d.

The DC modulators 402, 404, 406, and 408 may each have a positive input terminal 410, 414, 418, and 422, respectively, and a negative input terminal 412, 416, 420, and 424, respectively. DC modulators 402, 404, 406, and 408 may each be comprised of a coil 108, a boost switch 110, a diode 112, a capacitor 114, a controller 134, a programmable controller 136, and a memory 138 as described above with reference to FIG. 9A. As discussed above with reference to FIG. 9A, the two phase power grid line waveform may be tracked in real time and provided to the programmable controller 136. This tracked waveform may be used as a feed forward input to a control algorithm for the boost switch 110, which may enable the programmable controller 136 to create a modulated DC output to maintain a constant power output by controlling the operation of the boost switch 110. Additionally, a status of the combiner box 1002 may be provided to each programmable controller 136 via a communication input (not shown). The tracked waveform or the status of the combiner box 1002 may enable the programmable controller 136 to stop the DC output if the combiner box 1002 goes offline (e.g., during a fire), thereby acting as a failsafe enabling the DC outputs to be disabled remotely.

The coil 108, the boost switch 110, the diode 112, the capacitor 114, the controller 134, the programmable controller 136, and the memory 138 of each DC modulator 402, 404, 406, and 408 may be connected as described above with reference to FIG. 9A, and may operate together as described above with reference to FIG. 9A to generate a modulated DC output. DC modulators 402, 404, 406, and 408 may each have a positive output terminal 426, 430, 434, and 438, respectively, and a negative output terminal 428, 432, 436, and 440, respectively.

The positive output terminals 426, 430, 434, and 438 may be connected to a positive input terminal 1004 of the combiner box 1002. The negative output terminals 428, 432, 436, and 440 may be connected to a negative input terminal 446 of the combiner box 1002.

In the combiner box 1002, the input terminals of switches 1008 and 1010 may be connected in parallel with the positive input terminal 1002. The input terminals of switches 1012 and 1014 may be connected in parallel with the negative input terminal 1006. As an example, the switches 1008, 1010, 1012, and 1014 may be single MOSFETs, though any known type of technology capable of performing a switching function may be used, including relays, transistors, bi-polar transistors, insulated-gate bipolar transistors (IGBTs), silicon carbide relays, nitride transistors, thyristors, series connected MOSFETs, thyristor emulators, and diodes in series with IGBTs. The switches 1008, 1010, 1012, and 1014 may be similar to the switches 116, 118, 122, and 124 described above with reference to FIG. 9A. The switches 1008, 1010, 1012, and 1014 may be controlled via control signals from a controller 1020 sent via control lines A, B, C, and D, respectively.

An output terminal of switch 1008 and an output terminal of switch 1012 may be connected together to form a single output terminal. Connected together in this manner, the switches 1008 and 1012 may form a half bridge circuit. The output terminal of switch 1008 and the output terminal of switch 1012 may be connected together to form a single output terminal that may be connected to an input terminal of coil 1016. As an example, coil 1016 may be an inductor, configured to output current to line A. As an example, line A may be a single line connection to a two phase power grid. The connection of switches 1008 and 1012, coil 1016, and line A, may be similar to the connection between switches 116 and 122, coil 128, and line A discussed above with reference to FIG. 9A.

An output terminal of switch 1010 and an output terminal of switch 1014 may be connected together to form a single output terminal. Connected together in this manner, the switches 1010 and 1014 may form a half bridge circuit. The output terminal of switch 1010 and output terminal of switch 1014 may be connected together to form a single output terminal that may be connected to an input terminal of coil 1018. As an example, coil 1018 may be an inductor, configured to output current to line B. As an example, line B may be a single line connection to a two phase power grid. The connection of switches 1010 and 1014, coil 1018, and line B, may be similar to the connection between switches 118 and 124, coil 130, and line B discussed above with reference to FIG. 9A.

Controller 1020 may contain a programmable controller or processor 1022 and a memory 1024. The controller 1020 may be similar to the controller 134 discussed above with reference to FIG. 9A. The programmable controller 1022 may allow the controller 1020 to perform logic operations and to control the operation of switches 1008, 1010, 1012, and 1014 in response to information stored in the memory 1024. The control lines A, B, C, and D may be coupled to the programmable controller 1022 such that control signals from the programmable controller 1022 may be sent via the control lines A, B, C, and D to the switches 1010, 1012, 1014, and 1016.

In operation the power generation system 1000 may operate in a manner similar to the power generation system 900A discussed above with reference to FIG. 9A. DC current from the solar panels 102a, 102b, 102c, and 102d may be modulated by the DC modulators 402, 404, 406, and 408, respectively. The output of each DC modulator 402, 404, 406, and 408 may be individually synchronized to the two phase output envelope as discussed above with reference to FIG. 9A, but the individual outputs of DC modulators 402, 404, 406, and 408 need not be synchronized together. Inductance in the output lines A, B, and C may smooth the outputs of the DC modulators 402, 404, 406, and 408, thus synchronization of the individual outputs of DC modulators 402, 404, 406, and 408 may not be necessary. In an embodiment, the power generation system 1000 may combine the individual outputs of the DC modulators 402, 404, 406, and 408 in such a manner that the high frequency pulses from the DC modulators 402, 404, 406, and 408 may create an average voltage-current waveform that may mimic a desired clean modulated DC bus output.

The modulated DC output from each DC modulator 402, 404, 406, and 408 may be sent to the combiner box 1002. In this manner, the inversion of the modulated DC output to an AC output may occur at a centralized location, such as the combiner box 1002. The use of the centralized combiner box 1002 may allow the sharing of output components across multiple DC input sources. The output to lines A and B from the combiner box 1002 may be a two phase waveform as discussed above with reference to FIG. 9A.

Figure 11A:
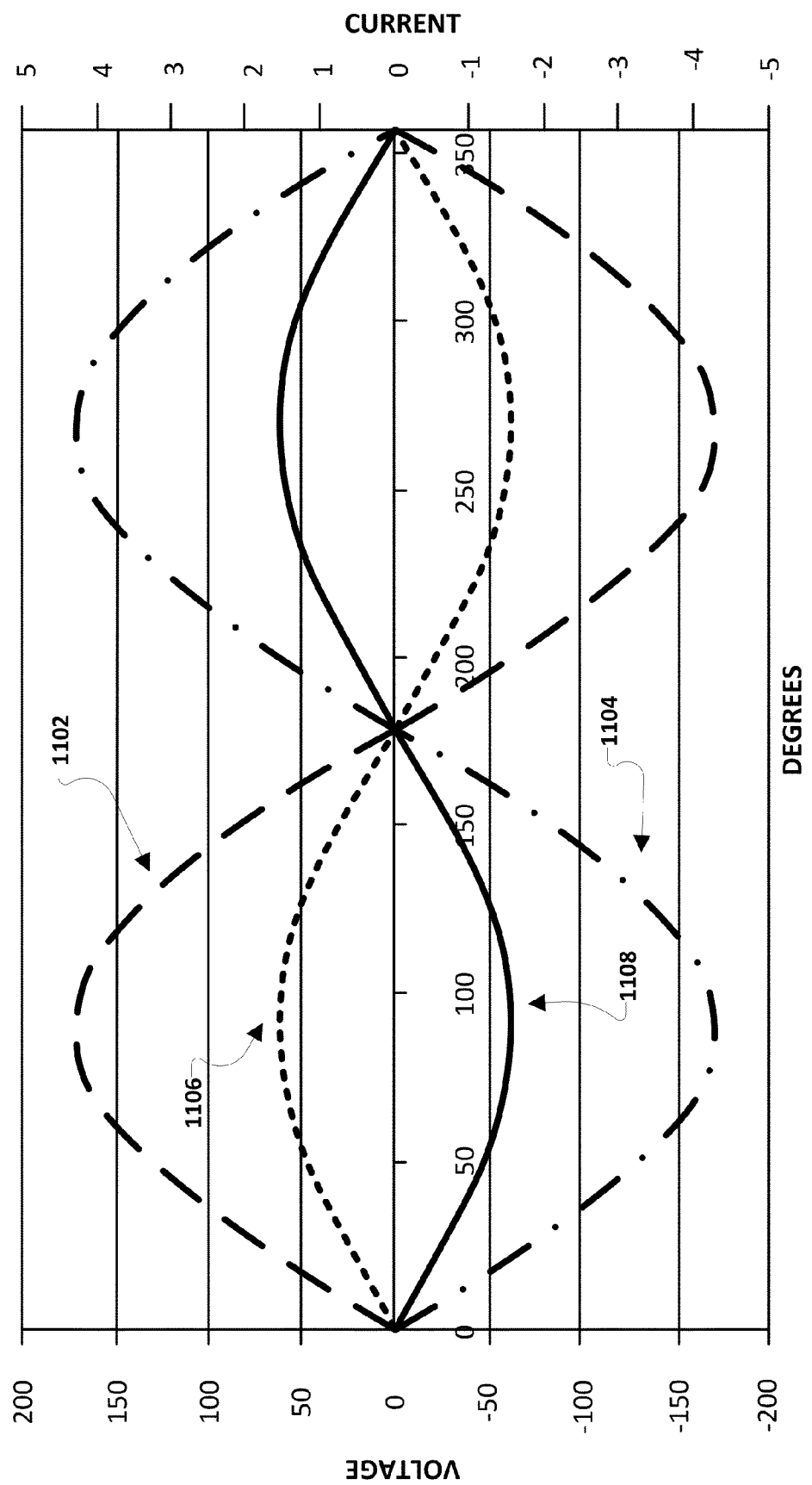
FIG. 11A is a graph of a two phase voltage and current envelope.

FIG. 11A illustrates the voltage and current wave forms of two phase power over a 360 degree cycle. Trace 1102 illustrates the voltage output of a first phase, such as Phase A. Trace 1106 illustrates the current output of the first phase, such as Phase A. Trace 1104 illustrates the voltage output of a second phase, such as Phase B. Trace 1108 illustrates the current output of the second phase, such as Phase B.

Figure 11B:
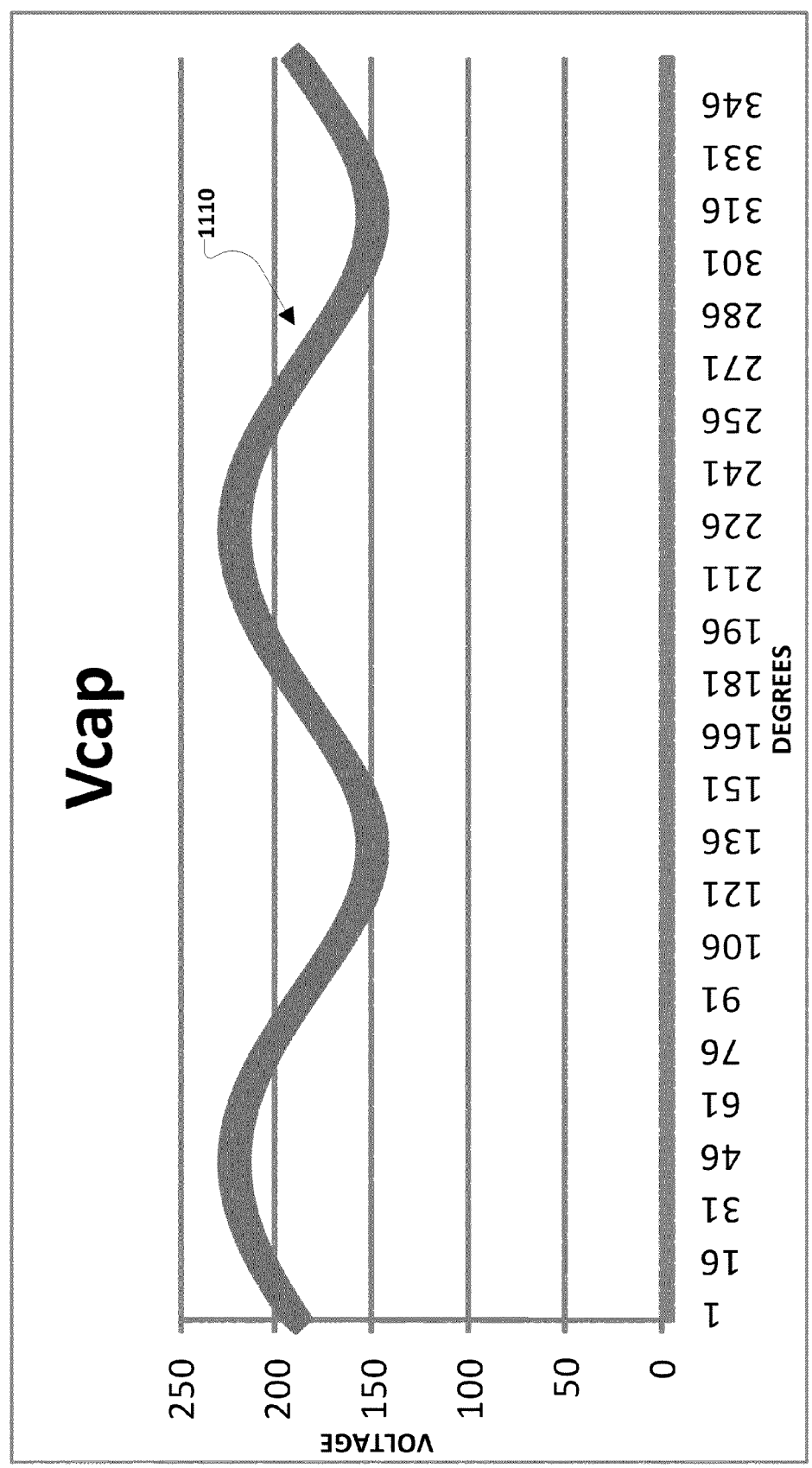
FIG. 11B is a graph of an intermediate storage capacitor voltage.

FIG. 11B illustrates the voltage across an intermediate storage capacitor, such as intermediate storage capacitor 904 described above with reference to FIG. 9C. Trace 1110 illustrates the voltage across the intermediate storage capacitor over a 360 degree cycle.

Figure 11C:
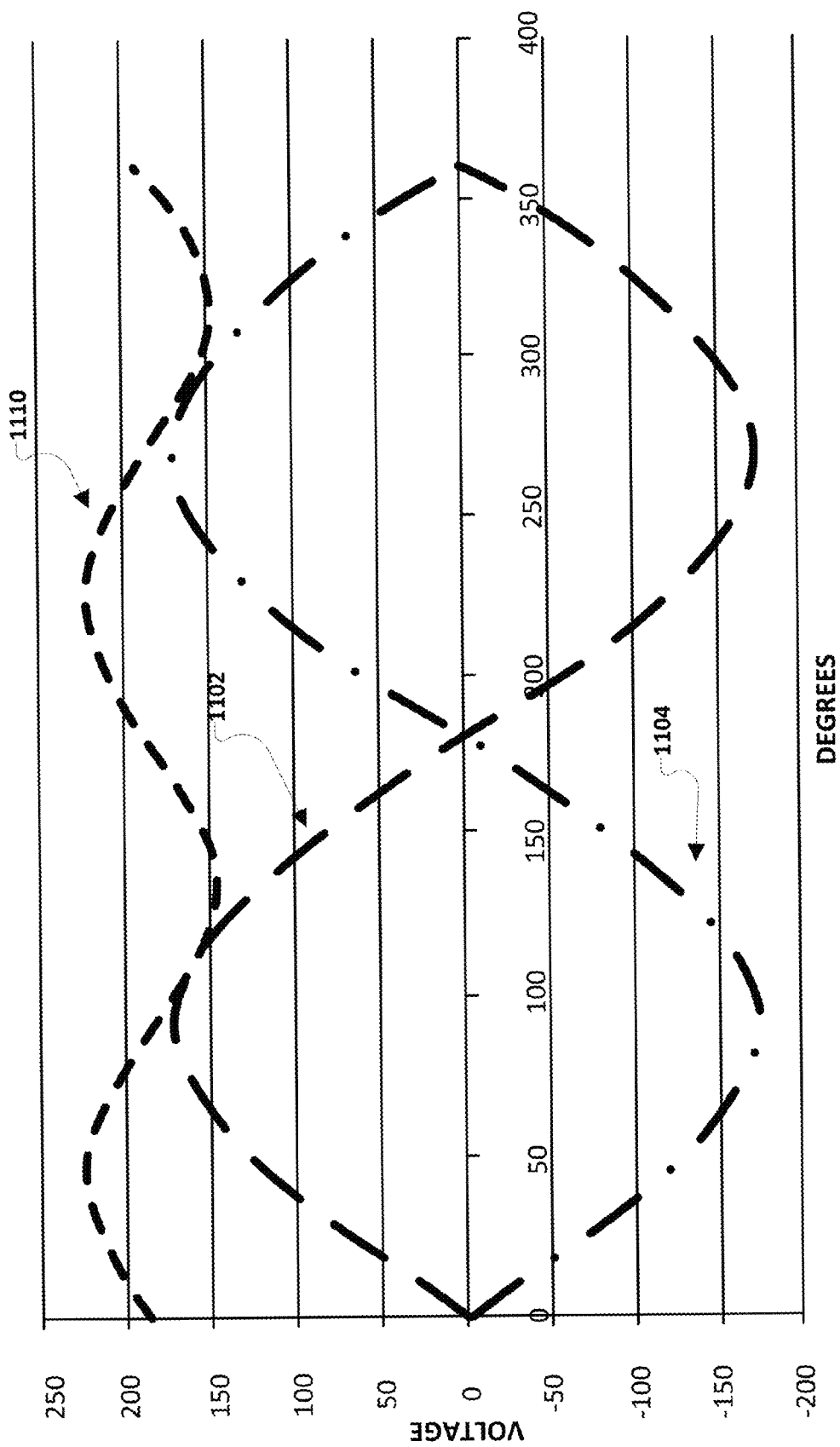
FIG. 11C is a graph of a two phase voltage envelope and an intermediate storage capacitor voltage.

FIG. 11C illustrates the voltage across the intermediate storage capacitor as illustrated in FIG. 11B overlaid with the voltage output of the two phase system as illustrated in FIG. 11A. As illustrated in FIG. 11C, the voltage across the capacitor illustrated in trace 1110 is at out above the Vrms of traces 1102 and 1104 at trace 1110's lowest point. In this manner the intermediate capacitor, such as intermediate capacitor 904, may provide extra power when the output phase and/or power exceed the average input power.

Figure 12:
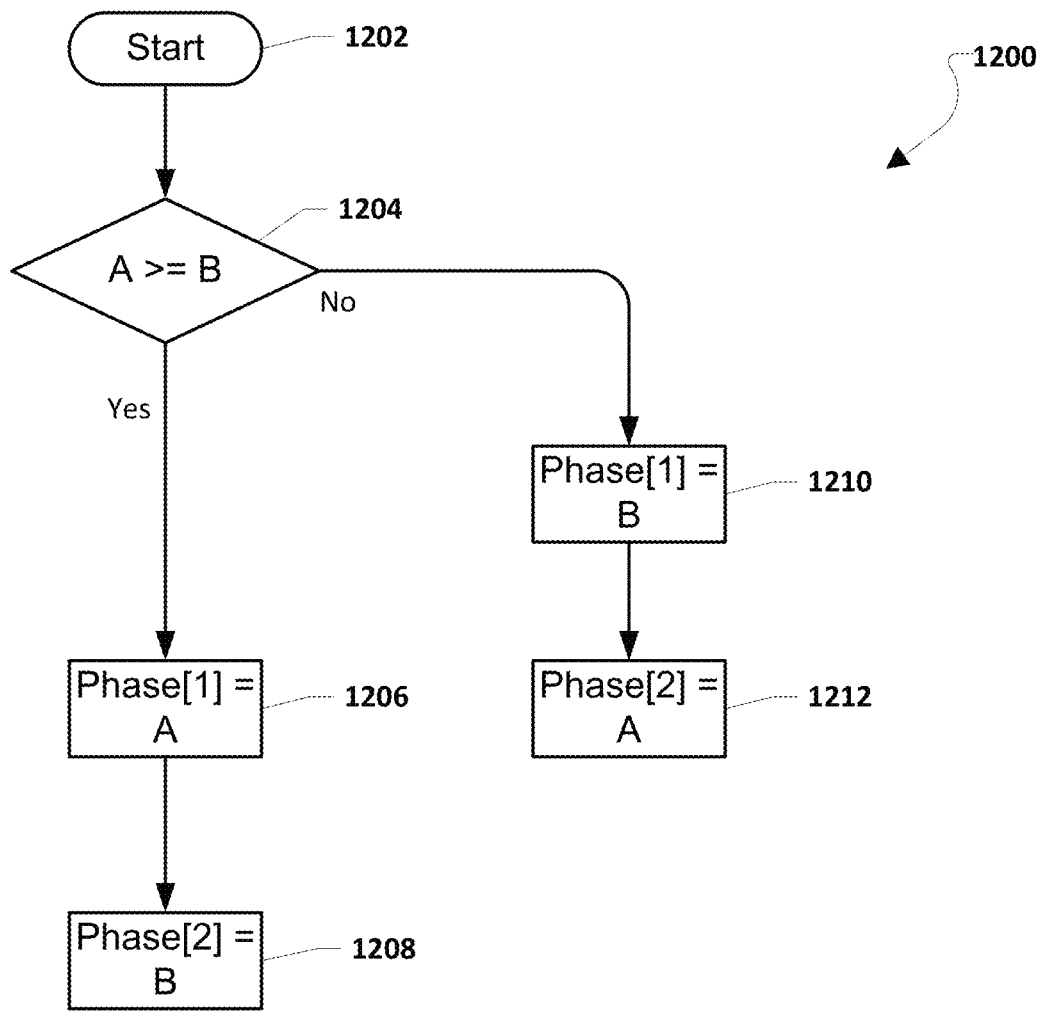
FIG. 12 is a process flow diagram illustrating another embodiment method for switch control in a power generation system.

FIG. 12 illustrates an embodiment method 1200 for determining which line of a two phase power generation system represents the maximum phase and that represents the minimum phase. As an example, the two phase power generation system may be the power generation system 900A described above with reference to FIG. 9A. The method 1200 may be implemented by the controller 134 of a power generation system 900A comparing the voltages on output lines A and B. In the embodiment method 1200 illustrated in FIG. 12, the maximum phase at any given time may be denoted Phase [1] and the minimum phase denoted Phase [2]. Output lines A and B may represent the two output lines of a two phase power generation system, such as the power generation system 900A illustrated in FIG. 9A.

At block 1202 the method 1200 may start in block 1202. At determination block 1204, the controller 134 may determine if the voltage on line A is greater than or equal to the voltage on line B. If the voltage on line A is greater than or equal to the voltage on line B (i.e., determination block 1204="Yes"), at block 1206 the controller 134 may assign line A as the maximum phase, Phase [1]. At block 1208 the controller 134 may assign line B as the minimum phase, Phase [2]. If the voltage on line A is less than the voltage on line B (i.e., determination block 1204="No"), at block 1210 the controller 134 may assign line B as the maximum phase, Phase [1]. At block 1212 the controller 134 may assign line A as the minimum phase, Phase [2].

Figure 13:
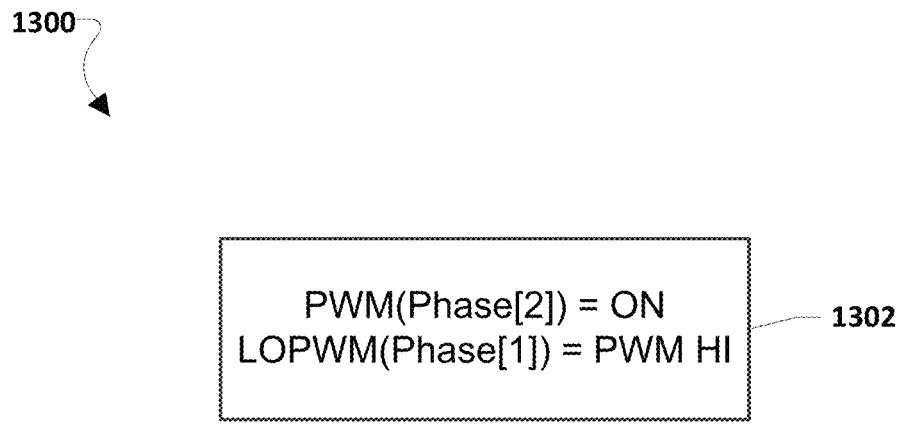
FIG. 13 is a process flow diagram illustrating a third embodiment method for controlling pulse width modulation in a power generation system.

FIG. 13 illustrates an embodiment method 1300 for determining the level of pulse width modulation to apply to the phases of two phase power generation system that may be used in conjunction with method 1200 described above. At block 1302 the switches for the minimum phase, Phase [2] may remain on, and only the switches for the maximum phase, Phase [3] may be pulse width modulated.

Pulse width modulation switching in a power supply may result in system losses from the switching element transitions, stray capacitive losses, and/or core losses in the inductive elements. The various embodiment switching algorithms described herein may limit such losses by minimizing the pulse width modulation switching required in a system. As discussed above, the three phases of electrical power in a three phase power generation system may be classified as High, Low, and Transition phases at any given time, with the High and Low phases on 100% so there are not associated pulse width modulation switching losses on the High and Low phases. The Transition phase may be pulse width modulated to create the balance of current between the High and Transition phases. Operating in such an ideal case may result in a transition glitch near the voltage cross over that may be handled by filtering in hardware and/or via algorithm modifications. The transition glitch may be based on a conflict that may occur between the two phases before and after the crossover point. The Transition phase may be operating in pulse width modulation mode between 0-100% on time that, for small components used in micro-inverters, may result in a Discontinuous Current Mode (DCM) that ramps up and back to zero on each cycle. DCM may require a voltage drop across the inductive element such that the current will ramp up to provide an average current at the desired level. After the Transition phase passes the voltage cross-over, the phase is operated 100% on in a Continuous Current Mode (CCM), that is the phase has become the High phase. For CCM operation the current through the coil may be defined by the average voltage across the coil divided by the coil DC Resistance (DCR) that may be a very small number. The transition glitch may result from a conflict when taking the last DCM point and the first CCM point because one requires a voltage to drive current and the other virtually no voltage across the inductor.

In an embodiment, the transition glitch may be addressed by hardware filtering. In an embodiment, the transition glitch may be handled via algorithm modifications that may help blend the gap between the DCM and CCM modes. In an embodiment, the High phase may be left in CCM and the transition may be controlled in CCM mode approaching the transition point. In another embodiment, the High phase may be switched to DCM so that both the High phase and Transition phase are in DCM at the voltage cross over. In a still further embodiment, both the High phase and Transition phase may be switched equally at the voltage cross over and blended between DCM and CCM on each side.

Figure 14:
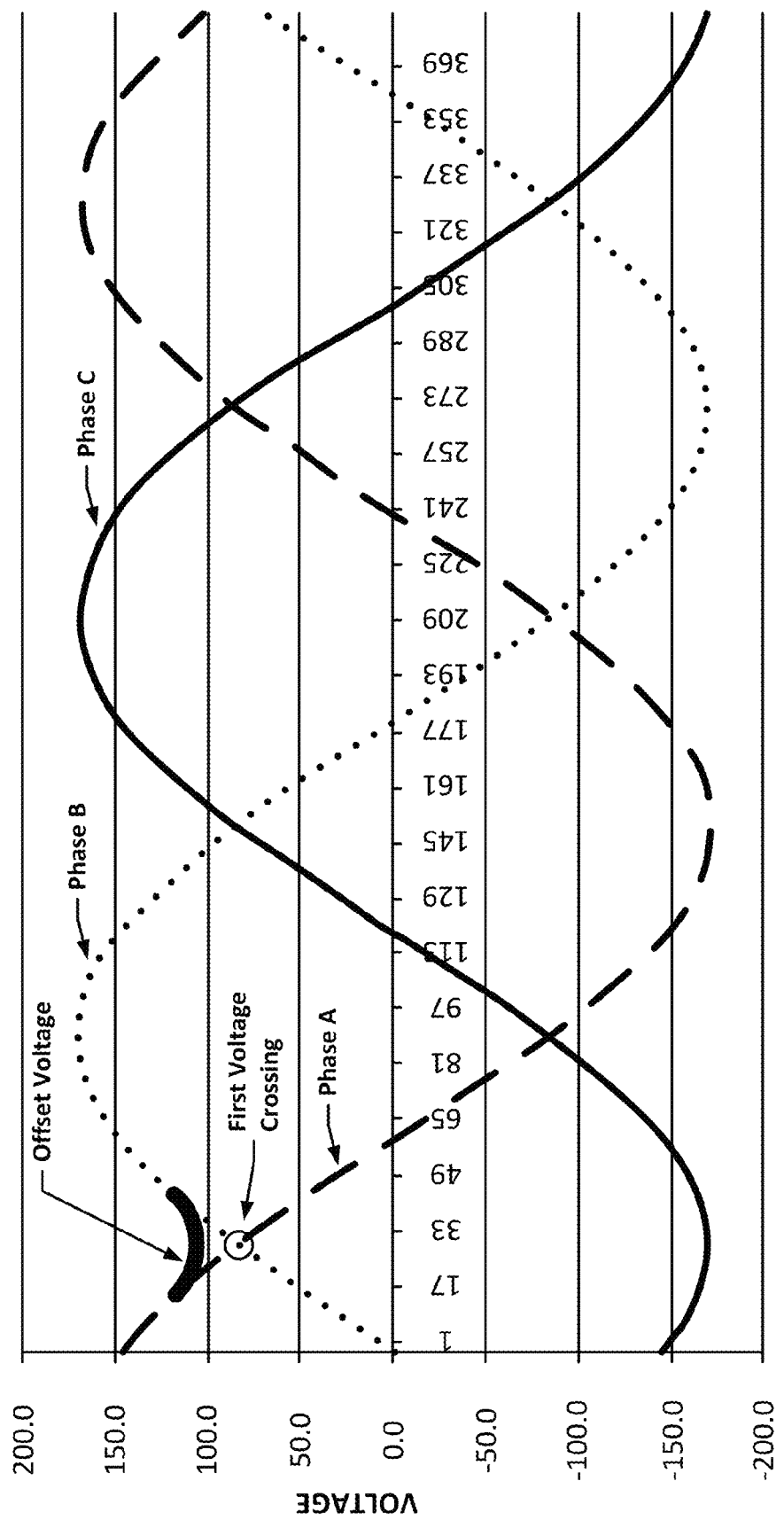
FIG. 14 is a graph of a three phase voltage envelope and offset voltage.

In an embodiment, the High phase and Transition phase may both be kept in a DCM at the voltage crossing. In order to have both the High phase and the Transition Phase in DCM operation at the voltage crossing the phases may require a large enough voltage across the output coils to allow the current to ramp up and back to zero within a pulse width modulation switching cycle. FIG. 14 is a graph of a three phase voltage envelope (i.e., Phase A, Phase B, and Phase C) and offset voltage, showing the offset voltage over the first voltage crossing. A line operating in CCM may not have a voltage drop across the inductor, but DCM may require a voltage drop. In order to generate the offset voltage as illustrated in FIG. 14, the high side switch (e.g., the activated switch for the line associated with Phase A from 0 to 30 degrees) may switch off (i.e., open) part time so as to limit the current through the switch. This may hold back some of the charge leaving the charge in the boost capacitor that may raise the voltage resulting in the offset voltage. The longer the high side switch is off, the more the voltage drop may be, and the more the waveform may look like the DCM waveform on the Transition phase (e.g., Phase B from 0 to 30 degrees).

In an embodiment, the minimum offset voltage for the DCM may be the voltage for which the current in the coil may ramp up and back to zero within the switching cycle such as to provide a desired average current. In an embodiment, the ramp up and ramp down voltages may be approximated as straight lines, and the peak current must reach twice the average current within the time constraints. The ramp-up slope may be determined as the ramp-up voltage divided by the output inductance and the ramp-down slope may be determined as the ramp down voltage divided by the output inductance. Assuming the peak current equals twice the average current, the time to ramp to zero may be determined as the peak current divided by the ramp-down slope and the time to ramp to twice the average current may be determined as the peak current divided by the ramp-up slope. The maximum ramp up time may be determined by subtracting the time to ramp down from the switching period. If the time to ramp up to twice the average current is less than or equal to the maximum ramp up time then the High phase may be operated in the DCM, and if the time to ramp up to twice the average current is greater the maximum ramp up time then the High phase may be operated in the CCM.

Figure 15:
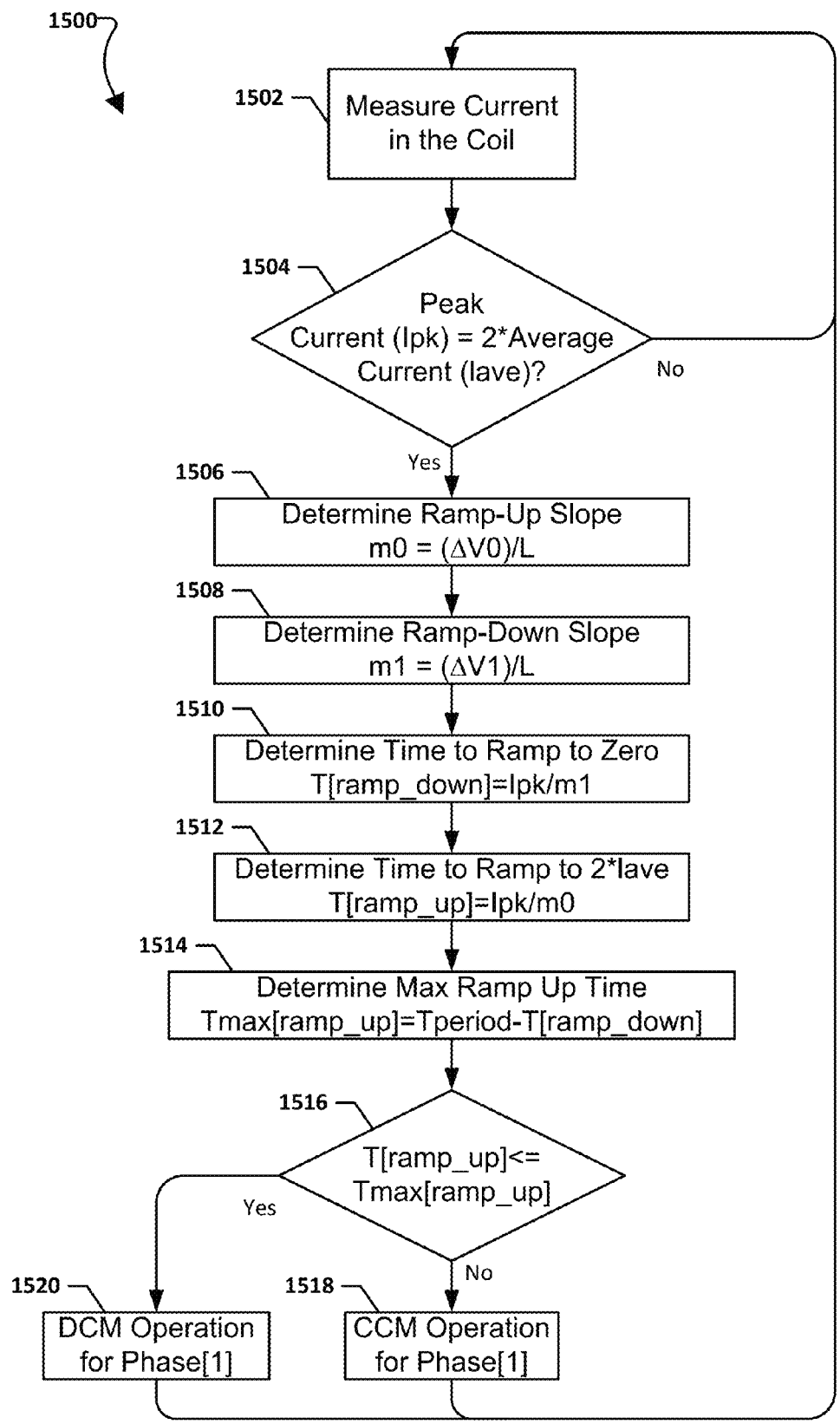
FIG. 15 is a process flow diagram illustrating an embodiment method for switch control of a phase approaching a transition point.

FIG. 15 illustrates an embodiment method 1500 for determining a switch control mode for the High phase approaching a transition point in a three phase power generation system that may be used in conjunction with methods 500, 600, and/or 600B described above. As an example, the three phase power generation system may be the power generation system 100 described above with reference to FIG. 1. The method 1500 may be implemented by the controller 134 of a power generation system 100 measuring the current in the coil 108. In the embodiment method 1500 illustrated in FIG. 15, the maximum phase (i.e., the High phase) denoted Phase [1] at any given time may be operated in CCM or DCM based on a comparison of the time to ramp up and the maximum ramp up time of the coil.

In block 1502 the controller 134 may measure the current in the coil 108. As an example, the controller 134 may measure the current in the coil 108 with a current sensor connected to the coil 108 and may store the current measurements in a memory 138 available to the controller 134. In determination block 1504 the controller 134 may determine whether the peak current (Ipk) is equal to twice the average current (2*Iave). In an embodiment, the controller 134 may determine whether Ipk is equal to 2*Iave by comparing the most recent current measurement to an average of stored current measurements over a given time period. If Ipk is not equal to 2*Iave (i.e., determination block 1504="No"), in block 1502 the controller 134 may continue to measure current in the coil. If Ipk is equal to 2*Iave (i.e., determination block 1504="Yes"), in block 1506 the controller 134 may determine the ramp-up slope (m0). In an embodiment, the ramp-up slope (m0) may be equal to the ramp-up voltage (ΔV0) divided by the output inductance (L). In an embodiment, the ramp-up voltage (ΔV0) and the output inductance (L) may be values stored in a memory 138 available to the controller 134. In block 1508 the controller 134 may determine the ramp-down slope (m1). In an embodiment, the ramp-down slope (m1) may be equal to the ramp-down voltage (ΔV1) divided by the output inductance (L). In an embodiment, the ramp-down voltage (ΔV1) and the output inductance (L) may be values stored in a memory 138 available to the controller 134. In block 1510 the controller 134 may determine the time to ramp to zero (T[ramp_down]). In an embodiment, T[ramp_down] may be equal to Ipk/m1. In block 1512 the controller 134 may determine the time to ramp to 2*Iave (T[ramp_up]). In an embodiment, T[ramp_up] may be equal to Ipk/m0. In block 1514 the controller 134 may determine the maximum ramp up time (Tmax[ramp_up]). In an embodiment, Tmax[ramp_up] may be equal to the switching period (Tperiod)−T[ramp_down]. In an embodiment, the switching period (Tperiod) may be a value stored in a memory 138 available to the controller 134. In determination block 1516 the controller 134 may determine whether T[ramp_up] is less than or equal to Tmax[ramp_up]. If T[ramp_up] is greater than Tmax[ramp_up] (i.e., determination block 1518="No"), in block 1518 the controller 134 may operate Phase [1] (i.e., the maximum (High) phase) in CCM and in block 1502 may continue to measure the current in the coil. In this manner, the current in the coil may be continually monitored to determine whether to operate Phase[1] in CCM or DCM. If T[ramp_up] is less than or equal to Tmax[ramp_up] (i.e., determination block 1518="Yes"), in block 1520 the controller 134 may operate Phase [1] (i.e., the maximum (High) phase) in DCM and in block 1502 may continue to measure the current in the coil.

The various embodiments described herein may be useful for controlling any source of direct current and converting the direct current to three phase alternating current. Examples of direct current sources include solar panel, wind turbine, battery, geothermal, tidal, hydroelectric, thermoelectric and piezoelectric power systems. For the purpose of discussion, the example of a solar system embodiment is used as an example for describing the functioning and capabilities of the various embodiments. However, one skilled in the art would recognize that the circuits and processes described herein may be applied to other direct current sources as well. Accordingly, the scope of the claims should not be limited to solar power applications except as expressly recited in the claims.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, programmable controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, programmable logic arrays, or any combination thereof. If implemented in software, the functions may be stored on or transmitted over as one or more instructions or code on a computer-readable medium. The steps of a method or algorithm disclosed herein may be embodied in a processor-executable software module executed that may reside on a tangible non-transitory computer-readable medium or processor-readable medium. Non-transitory computer-readable and processor-readable media may be any available media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A device for generating three phase alternating electrical current from a direct electrical current, the device comprising:
a first coil, wherein an input terminal of the first coil is configured to be connected to a positive electrical output terminal of a direct electrical current source;
a first boost switch, wherein an input terminal of the first boost switch is connected to an output terminal of the first coil and an output terminal of the first boost switch is configured to be connected to a negative electrical output terminal of the direct electrical current source;
a first diode, wherein an input terminal of the first diode is connected to the output terminal of the first coil and the first diode is configured to prevent the flow of current from the first diode to the output terminal of the first coil;
a first capacitor, wherein an input terminal of the first capacitor is connected to an output terminal of the first diode and an output terminal of the first capacitor is configured to be connected to the negative electrical output terminal of the direct electrical current source;
a first input terminal for receiving a positive pulse amplitude modulated electrical current, wherein the first input terminal is connected to the output terminal of the diode;

a second input terminal for receiving a negative pulse amplitude modulated electrical current, wherein the second input terminal is connected to the output terminal of the first capacitor;

a first, a second, and a third switch connected in parallel with the first input terminal;

a fourth, a fifth, and a sixth switch connected in parallel with the second input terminal;

a first output terminal connected to an output of the first switch and an output of the fourth switch;

a second output terminal connected to an output of the second switch and an output of the fifth switch;

a third output terminal connected to an output of the third switch and an output of the sixth switch; and a processor coupled to the first boost switch and the first, second, third, fourth, fifth, and sixth switches, wherein the processor is configured to control the operation of each switch to generate a first phase of power on the first output terminal, a second phase of power on the second output terminal, and a third phase of power on the third output terminal; and a memory coupled to the processor, wherein the processor is configured with processor-executable instructions to perform operations comprising:

opening and closing the first boost switch to generate a modulated direct current output; and converting the modulated direct current output into three phase alternating current by performing operations comprising:

closing the first and sixth switches and opening the second, third, fourth, and fifth switches thereby generating a first phase of power at the first output terminal with a positive polarity, a second phase of power at the second output terminal with a neutral polarity, and the third phase of power at the third output terminal with a negative polarity;

closing and opening the second switch while leaving the first and sixth switches closed and the third, fourth, and fifth switches open to create a positive voltage at the second output terminal thereby giving a positive polarity to the first phase of power and second phase of power and a negative polarity to the third phase of power, wherein the duty cycle for the closing and opening of the second switch is determined based on a comparison of a voltage difference between the first output terminal and third output terminal and a voltage difference between the second output terminal and third output terminal;

closing the second switch and the sixth switch and opening and closing the first switch while leaving the third, fourth, and fifth switches open when the voltage at the second output terminal exceeds the voltage at the first output terminal, wherein the duty cycle for the closing and opening of the first switch is determined based on the comparison of the voltage difference between the first output terminal and third output terminal and the voltage difference between the second output terminal and third output terminal;

closing the second and sixth switches and opening the first, third, fourth, and fifth switches thereby giving a neutral polarity to the first phase of power at the first output terminal, a positive polarity to the second phase of power at the second output terminal, and a negative polarity to the third phase of power at the third output terminal;

closing and opening the fourth switch while leaving the second and sixth switches closed and the first, third, and fifth switches open to create a negative voltage at the first output terminal thereby giving a negative polarity to the first phase of power and third phase of power and a positive polarity to the second phase of power, wherein the duty cycle for the closing and opening of the fourth switch is determined based on a comparison of the voltage difference between the first output terminal and third output terminal and the voltage difference between the second output terminal and third output terminal;

closing the second switch and the fourth switch and opening and closing the sixth switch while leaving the first, third, and fifth switches open when the voltage at the first output terminal is less than the voltage at the third output terminal, wherein the duty cycle for the closing and opening of the sixth switch is determined based on a comparison of a voltage difference between the second output terminal and first output terminal and a voltage difference between the third output terminal and first output terminal;

closing the second and fourth switches and opening the first, third, fifth, and sixth switches thereby giving a neutral polarity to the third phase of power at the third output terminal, a positive polarity to the second phase of power at the second output terminal, and a negative polarity to the first phase of power at the first output terminal;

closing and opening the third switch while leaving the second and fourth switches closed and the first, fifth, and sixth switches open to create a positive voltage at the third output terminal thereby giving a positive polarity to the second phase of power and third phase of power and a negative polarity to the first phase of power, wherein the duty cycle for the closing and opening of the third switch is determined based on a comparison of a voltage difference between the second output terminal and first output terminal and a voltage difference between the third output terminal and first output terminal;

closing the third switch and the fourth switch and opening and closing the second switch while leaving the first, fifth, and sixth switches open when the voltage at the third output terminal exceeds the voltage at the second output terminal, wherein the duty cycle for the closing and opening of the second switch is determined based on the comparison of the voltage difference between the second output terminal and first output terminal and the voltage difference between the third output terminal and first output terminal;

closing the third and fourth switches and opening the first, second, fifth, and sixth switches thereby giving a neutral polarity to the second phase of power at the second output terminal, a positive polarity to the third phase of power at the third output terminal, and a negative polarity to the first phase of power at the first output terminal;

closing and opening the fifth switch while leaving the third and fourth switches closed and the first, second, and sixth switches open to create a negative voltage at the second output terminal thereby giving a negative polarity to the second phase of power and first phase of power and a positive polarity to the third phase of power, wherein the duty cycle for the closing and opening of the fifth switch is determined based on a comparison of the voltage difference between the second output terminal and first output terminal and the voltage difference between the third output terminal and first output terminal;

closing the third switch and the fifth switch and opening and closing the fourth switch while leaving the first, second, and sixth switches open when the voltage at the second output terminal is less than the voltage at the first output terminal, wherein the duty cycle for the closing and opening of the fourth switch is determined based on a comparison of a voltage difference between the first output terminal and second output terminal and a voltage difference between the third output terminal and second output terminal;

closing the third and fifth switches and opening the first, second, fourth, and sixth switches thereby giving a neutral polarity to the first phase of power at the first output terminal, a positive polarity to the third phase of power at the third output terminal, and a negative polarity to the second phase of power at the second output terminal;

closing and opening the first switch while leaving the third and fifth switches closed and the second, fourth, and sixth switches open to create a positive voltage at the first output terminal thereby giving a positive polarity to the third phase of power and first phase of power and a negative polarity to the second phase of power, wherein the duty cycle for the closing and opening of the first switch is determined based on a comparison of a voltage difference between the first output terminal and second output terminal and a voltage difference between the third output terminal and second output terminal;

closing the first switch and the fifth switch and opening and closing the third switch while leaving the second, fourth, and sixth switches open when the voltage at the first output terminal exceeds the voltage at the third output terminal, wherein the duty cycle for the closing and opening of the third switch is determined based on the comparison of the voltage difference between the third output terminal and second output terminal and the voltage difference between the first output terminal and second output terminal;

closing the first and fifth switches and opening the second, third, fourth, and sixth switches thereby giving a neutral polarity to the third phase of power at the third output terminal, a positive polarity to the first phase of power at the first output terminal, and a negative polarity to the second phase of power at the second output terminal;

closing and opening the sixth switch while leaving the first and fifth switches closed and the second, third, and fourth switches open to create a negative voltage at the third output terminal thereby giving a negative polarity to the third phase of power and second phase of power and a positive polarity to the first phase of power, wherein the duty cycle for the closing and opening of the sixth switch is determined based on a comparison of the voltage difference between the third output terminal and second output terminal and the voltage difference between the first output terminal and second output terminal;

closing the first switch and the sixth switch and opening and closing the fifth switch while leaving the second, third, and fourth switches open when the voltage at the third output terminal is less than the voltage at the second output terminal, wherein the duty cycle for the closing and opening of the fifth switch is determined based on a comparison of a voltage difference between the second output terminal and third output terminal and a voltage difference between the first output terminal and third output terminal; and closing the third and fifth switches and opening the first, second, fourth, and sixth switches thereby giving a neutral polarity to the first phase of power at the first output terminal, a positive polarity to the third phase of power at the third output terminal, and a negative polarity to the second phase of power at the second output terminal.

2. The device of claim 1, further comprising:
a second coil, wherein an input terminal of the second coil is configured to be connected to the positive electrical output terminal of the direct electrical current source;
a second boost switch, wherein an input terminal of the second boost switch is connected to an output terminal of the second coil and an output terminal of the second boost switch is configured to be connected to the negative electrical output terminal of the direct electrical current source; and
a second diode, wherein an input terminal of the second diode is connected to the output terminal of the second coil and the second diode is configured to prevent the flow of current from the second diode to the output terminal of the second coil, and wherein the output terminal of the second diode is connected to the input terminal of the first capacitor, and
wherein the processor is further coupled to the second boost switch and configured to control the operation of the second boost switch.

3. The device of claim 2, further comprising:
a third coil having an output terminal and an input terminal, wherein the input terminal of the third coil is configured to be connected to the positive electrical output terminal of the direct electrical current source;
a third boost switch having an output terminal and an input terminal, wherein the input terminal of the third boost switch is connected to the output terminal of the third coil and the output terminal of the third boost switch is configured to be connected to the negative electrical output terminal of the direct electrical current source; and
a third diode having an output terminal and an input terminal, wherein the input terminal of the third diode is connected to the output terminal of the third coil and the third diode is configured to prevent the flow of current from the third diode to the output terminal of the third coil, and wherein the output terminal of the third diode is connected to the input terminal of the first capacitor,
wherein the processor is further coupled to the third boost switch and configured to control the operation of the third boost switch.

4. The device of claim 1, wherein:
the first diode is a control switch;
the processor is further coupled to the control switch; and the processor is configured to control the operation of the control switch to prevent the flow of current from the control switch to the output terminal of the first coil.

\* \* \* \* \*